United States Patent
Deutsch et al.

(10) Patent No.: US 10,802,910 B2
(45) Date of Patent: Oct. 13, 2020

(54) SYSTEM FOR IDENTIFYING AND CORRECTING DATA ERRORS

(71) Applicant: Intel Corporation, Santa Clara, CA (US)

(72) Inventors: Sergej Deutsch, Hillsboro, OR (US); Wei Wu, Portland, OR (US); David M. Durham, Beaverton, OR (US); Karanvir S. Grewal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 81 days.

(21) Appl. No.: 16/133,574

(22) Filed: Sep. 17, 2018

(65) Prior Publication Data

US 2019/0042369 A1    Feb. 7, 2019

(51) Int. Cl.
| | |
|---|---|
| *G06F 11/10* | (2006.01) |
| *G06F 11/14* | (2006.01) |
| *G06F 3/06* | (2006.01) |
| *G06F 21/62* | (2013.01) |

(52) U.S. Cl.
CPC .......... *G06F 11/1048* (2013.01); *G06F 3/064* (2013.01); *G06F 3/0619* (2013.01); *G06F 3/0673* (2013.01); *G06F 11/108* (2013.01); *G06F 11/1068* (2013.01); *G06F 11/1076* (2013.01); *G06F 11/1435* (2013.01); *G06F 21/6218* (2013.01); *G06F 2221/2107* (2013.01)

(58) Field of Classification Search
CPC .. G06F 11/10; G06F 11/1048; G06F 11/1068; G06F 11/1435; G06F 3/0619; G06F 3/064; G11C 29/04; G11C 29/42; G11C 29/52; G11C 29/028; H03M 13/09; H03M 13/2906
See application file for complete search history.

(56) References Cited

U.S. PATENT DOCUMENTS

| | | | | |
|---|---|---|---|---|
| 2004/0003336 | A1* | 1/2004 | Cypher | ................. G11C 29/42 714/763 |
| 2014/0181615 | A1* | 6/2014 | Kwok | ............... H03M 13/2906 714/755 |
| 2018/0091308 | A1 | 3/2018 | Durham et al. | |
| 2019/0294499 | A1* | 9/2019 | Yang | ..................... H03M 13/09 |

OTHER PUBLICATIONS

Durham, David M., U.S. Appl. No. 15/908,205, titled "Techniques for Detecting and Correcting Errors in Data", filed Feb. 28, 2018, 67 pages.

* cited by examiner

*Primary Examiner* — Shelly A Chase
(74) *Attorney, Agent, or Firm* — Alliance IP, LLC

(57) ABSTRACT

In one embodiment, an apparatus comprises a controller comprising circuitry, the controller to generate an error correction code for a memory line, the memory line comprising a plurality of first data blocks, wherein the error correction code comprises parity bits generated based on first portions of a plurality of second data blocks, wherein the plurality of second data blocks are the first data blocks or diffused data blocks generated from the plurality of first data blocks; generate a metadata block corresponding to the memory line, wherein the metadata block comprises the error correction code for the memory line and at least one metadata bit; encode the first data blocks and the metadata block; and provide the encoded data blocks and the encoded metadata block for storage on a memory module.

21 Claims, 8 Drawing Sheets

SYSTEM FOR IDENTIFYING AND CORRECTING DATA ERRORS

BACKGROUND

Managing errors in data may include utilization of error correction techniques in conjunction with data storage and communication. Error correction may involve identifying and/or correcting errors that occur in data. In computer technology, error correction may be utilized to detect and correct data corruption, such as with error-correcting code (ECC) memory. Data corruption may refer to errors in computer data that occur during writing, reading, storage, transmission, or processing which introduce undesired changes to the original data. In the absence of error correcting techniques, data corruption may cause data loss and/or system failure.

BRIEF DESCRIPTION OF THE DRAWINGS

Like reference numbers and designations in the various drawings indicate like elements.

DETAILED DESCRIPTION

Figure 1:
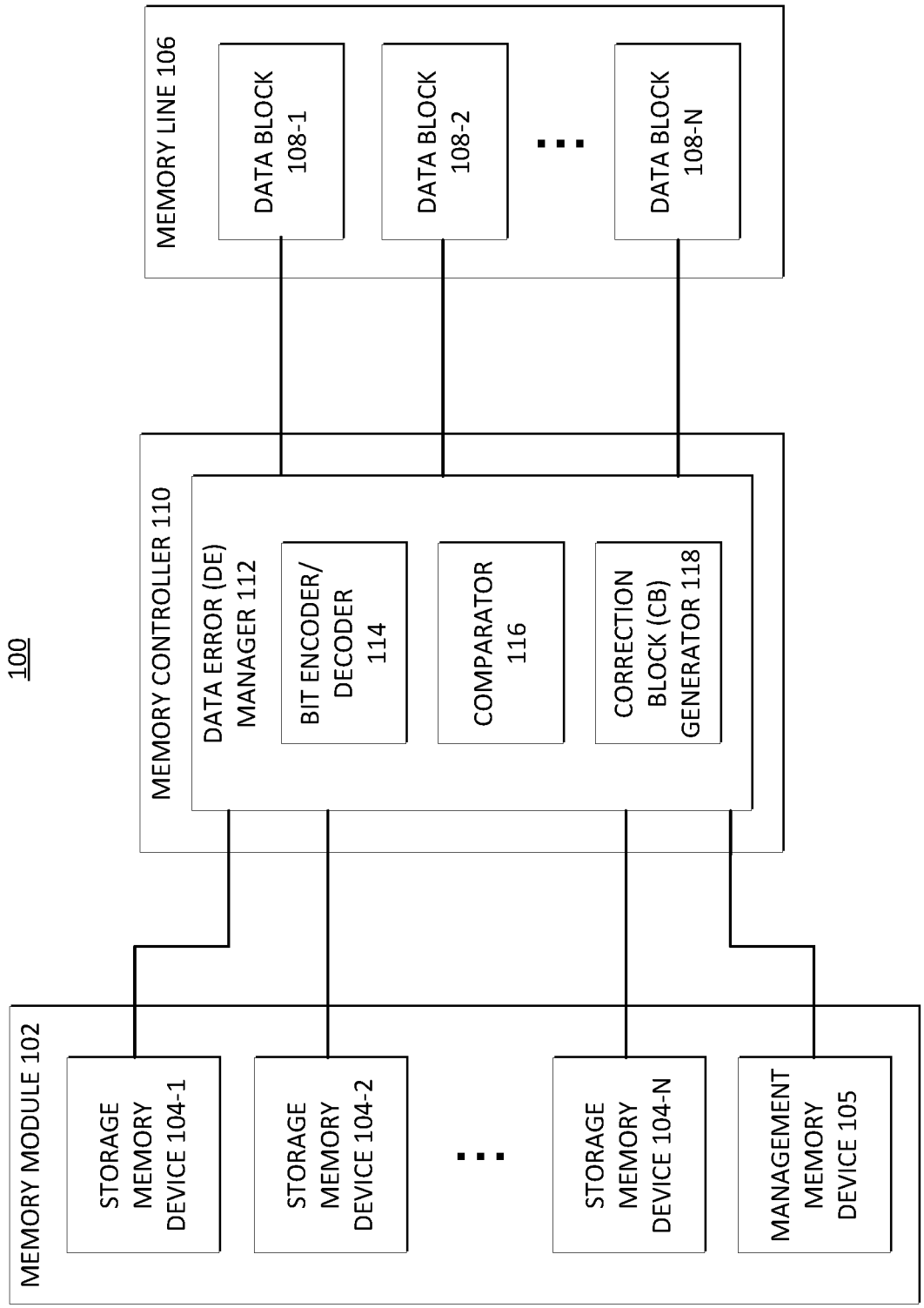
FIG. 1 illustrates a system for identifying and correcting data errors in accordance with certain embodiments.

Various embodiments are generally directed to techniques for managing errors in data, by using error-correcting code (ECC) techniques, for instance. Some embodiments are particularly directed to providing one or more of error detection, location, and correction for a set of storage memory devices by utilizing a single management memory device. In one or more embodiments, the storage and management memory devices may each include a memory chip, and the collective memory chips may be disposed on the same memory module, such as a dual in-line memory module (DIMM). For instance, each memory device be a dynamic random-access memory (DRAM) integrated circuit included in a DIMM. In various embodiments, the set of storage management memory devices may be used to store a memory line, such as an evicted cache line. In many embodiments, cryptographically secure memory encryption and/or integrity may also be provided for the set of storage memory devices and the management memory device.

Some challenges facing the management of data errors include the inability to provide error detection, location, and correction without excessive memory overhead. These challenges may result from an ECC memory requiring two or more management memory devices to enable error corrections for a set of storage memory devices. For example, a first management memory device may be used to locate bit errors and a second management memory device may be used to store parity bits to correct bit errors. Where each memory device is a memory chip, such a scheme may include two memory chips in addition to the memory chips that store the target data in order to support error correction. For instance, a memory module according to the fifth generation of double data rate synchronous dynamic random-access memory (DDR5) may utilize eight storage memory devices on a DIMM to store memory lines and two management memory devices for ECC, where a first memory management device may store parity data and a second memory management device may store error locators (e.g., using a Reed-Solomon code) and additional metadata bits.

In some schemes, ECC memory may also lack security. In such schemes, a malicious user may be able to reverse the ECC algorithm and flip bits that could allow modified or corrupted data to pass undetected. In other embodiments, securing ECC memory cryptographically may utilize additional memory, such as to store indications of message authentication codes (MACs). For example, software guard extensions (SGX) may incur a 25% memory overhead for MAC storage while reducing performance 2X due to extra memory reads/writes to manage the MACs due to twice the bandwidth overhead. These and other factors may result in management of data errors with lower performance, excessive overhead, insufficient data security, and increased costs (e.g., due to additional memory chips, wiring, and complexity). Such limitations may reduce the capabilities, usability, and applicability of data error managers, contributing to inefficient systems with limited capabilities, undesirable features, and higher costs.

Various embodiments described herein include a data error manager that is able to provide error detection, location, and correction and metadata storage for a memory module (e.g., a DIMM) with a single management memory device. In various embodiments, cryptographically secure memory encryption and/or integrity may additionally, or alternatively, be provided for the set of storage memory devices with the single management device. In some embodiments, ECC and metadata may be combined with a cryptographically strong message authentication code (MAC) that cannot be circumvented by either random errors or adversarial attacks on physical memory (e.g., via a logic probe, field programmable gate array (FPGA), man-in-the-middle attack on the memory bus, processor to processor interconnect, or other attack). Thus, various embodiments may enable one or more of quick and efficient error corrections, memory protections, improved memory efficiency, improved memory performance, reduced memory hardware, and reduced memory bandwidth utilization, resulting in one or more technical effects and advantages. As an example, ECC memory can be offered at a lower cost without sacrificing security via memory encryption with cryptographic integrity.

FIG. 1 illustrates a system 100 for identifying and correcting data errors in accordance with certain embodiments. System 100 may include a memory module 102 with storage memory devices 104-1, 104-2, ... 104-N (referred to herein as storage memory devices 104) and management memory device 105, memory controller 110 with data error (DE) manager 112, and memory line 106 with data blocks 108-1, 108-2, . . . 108-N (referred to herein as data blocks 108), where N is any suitable integer. In various embodiments, memory module 102 may include multiple management memory devices 105. In one or more embodiments, DE manager 112 may provide error correction for data stored in memory module 102, such as by generating and storing error correction data in management memory device 105. In one or more such embodiments, error correction data may enable one or more of detection, location, and correction of errors in memory module 102. In many embodiments, DE manager 112 may also, or alternatively, provide cryptographically secure memory encryption and integrity for data stored in memory module 102. In various embodiments described herein, DE manager 112 may provide, via a single management memory device (e.g., management memory device 105), one or more of error detection, location, correction, encryption, and integrity for data stored in multiple storage memory devices 104 of memory module 102. In some embodiments, DE manager 112 may be able to detect, locate, and correct multiple errors occurring in a data block or metadata block in a storage memory device 104 or a management memory device 105.

Memory line 106 may represent data to be stored in memory module 102. In various examples, memory line 106 may include a cache line that has been evicted from a processor cache (e.g., of a host device) that is to be stored in memory module 102 or a cache line that is to be loaded/retrieved from a memory (e.g., memory module 102) and placed into the processor cache. In some embodiments, data blocks 108-1, 108-2, . . . 108-N may each represent a distinct portion of the memory line 106, such as a memory row. In various embodiments, data representing each of data blocks 108 may be stored in corresponding storage memory devices 104-1, 104-2, . . . 104-n. For example, data representing data block 108-1 may be stored in storage memory device 104-1, data representing data block 108-2 may be stored in storage memory device 104-2, and so on. In one example, DE manager 112 may perform a bit encoding operation on data block 108-1 and store the result in storage memory device 104-1, then (or simultaneously) perform a bit encoding operation on data block 108-2 and store the result in storage memory device 104-2, and so on for each data block of memory line 106. Thus, in some embodiments, the number of data blocks 108 of a memory line 106 may equal the number of storage memory devices 104 in memory module 102.

In particular embodiments, DE manager 112 may store metadata associated with memory lines in management memory device 105 to enable one or more of error detection, location, correction, encryption, and integrity for data stored in memory module 102. In many such embodiments, at least a portion of the data stored in management memory device 105 is generated based on data of memory line 106. In some embodiments, metadata blocks associated with memory lines are stored based on the storage location of data blocks representing the memory lines. For example, if data blocks representing a particular memory line are stored in respective first physical rows of storage memory devices 104, a corresponding metadata block is stored in the first physical row of management memory device 105; if data blocks representing another memory line are stored in respective second physical rows of storage memory devices 104, a corresponding metadata block is stored in the second physical row of management memory device 105, and so on. Other embodiments may include different storage schemas.

In various embodiments, memory module 102 may comprise computer memory that includes a plurality of memory chips that can be represented by storage memory devices 104 and management memory device 105. For example, management memory device 105 may be a first memory chip, storage memory device 104-1 may be a second memory chip, storage memory device 104-2 may be a third memory chip, and so on. In one example, memory module 102 may include a DIMM with a set of memory chips. In some embodiments, multiple memory modules 102 (e.g., DIMMs) may be included in a computer system. In some such embodiments, the collection of memory modules 102 in a computer may be referred to as or included within the external memory of the computer (e.g., random access memory (RAM)).

In various embodiments, storage memory devices 104 and management memory device 105 of memory module 102 may include one or more of ECC memory, DDR memory, hard drive storage, redundant array of independent disks (RAID) storage, flash memory, nonvolatile memory, 3D crosspoint memory, and the like. In some embodiments, each storage memory device 104 and management memory device 105 in memory module 102 may be the same or similar. For example, each device may comprise the same amount(s) of the same type(s) of memory. As another example, each device may comprise the same form factor (e.g., physical dimensions, electrical connector pinout, etc.) In such embodiments, distinctions between storage memory devices 104 and management memory device 105 may reside in the purpose they are used for. Therefore, in some such embodiments, whether a memory device is used as a management memory device 105 or a storage memory device 104 may be arbitrary and/or selectable.

From a redundancy perspective, the distinctions between the memory devices may be physical boundaries that represent the probable extent of a physical failure. For instance, one physical chip or its associated wiring may fail, while the other physical chips or their associated wiring may remain operational. In other embodiments, the physical boundaries may be defined within the physical device, such as a physical row, column, bank, or other adjacency of memory circuits. For example, in a RAID system, each storage memory device 104 may be a distinct hard drive and management memory device 105 may be a separate hard drive used to correct one or more failing hard drives.

Memory controller 110 may include DE manager 112 as well as other circuitry (e.g., circuitry for communicating with memory module 102). DE manager 112 may include bit encoder/decoder 114, comparator 116, and metadata block (MB) generator 118, and any other suitable circuitry. In some embodiments, DE manager 112 may implement ECC, such as via one or more of bit encoder/decoder 114, comparator 116, and MB generator 118. In one or more embodiments, DE manager 112 may utilize bit encoder/decoder 114, comparator 116, and/or MB generator 118 to provide error correction for data stored in memory module 102. DE manager 112 may utilize management memory device 105 to store data used to enable the error detection, error correction, confidentiality, and/or integrity. For example, data generated by one or more of bit encoder/decoder 114, comparator 116, and MB generator 118 may be stored in management memory device 105. For example, data such as correction blocks, may be generated and stored in management memory device 105 to facilitate detection of and/or correction of data errors present in data stored in one or more storage memory devices 104.

In various embodiments, the DE manager 112 is able to provide error detection, location, correction, confidentiality, and/or integrity for the storage memory devices 104, at least in part by performing various logical operations on data blocks 108 utilizing components of DE manager 112, such as bit encoder/decoder 114, comparator 116, and MB generator 118. In various embodiments, DE manager 112 may implement one or more of these features for data to be stored by a group of storage memory devices 104 via a single management memory device (e.g., management memory device 105). In various embodiments, using a single management memory device 105 to implement one or more of the features described herein may reduce the resources required to implement the one or more features described herein. In some embodiments, DE manager 112 may combine ECC with a cryptographically strong MAC that prevents circumvention by either random errors or adversarial attack on physical memory (e.g., memory chips). In one or more embodiments, DE manager 112 may store the combined ECC and MAC in management memory device 105. In some embodiments, MACs may be used for one or more of memory integrity, providing a variety of usages including data corruption detection, memory access control, virtual machine isolation, or other purposes.

In one or more embodiments, bit encoder/decoder 114 may be used to randomize/derandomize bits in a data block 108 prior to the bits being stored in memory module 102. For example, data block 108-1 may be randomized to generate an encoded block that is stored in storage memory device 104-1. In some embodiments, data transformations by bit encoder/decoder 114 may result in bit diffusion (permutation and distribution) such that a one-bit change in the input will on average flip 50% of the bits in the output. In various embodiments, bit encoder/decoder 114 may provide two-way operation such that any data transformations performed by bit encoder/decoder 114 may be reversible, such as through cryptography. For instance, data blocks 108 may be recovered from encoded data blocks stored in memory module 102. Some embodiments may include separate bit encoder and bit decoder components. In various embodiments, encoding and decoding may be inverse operations. In some embodiments, encoding and decoding may be symmetric operations. Exemplary memory read and write flows will be described in more detail below in connection with FIG. 2 and FIG. 3.

In some embodiments, bit encoder/decoder 114 may utilize a cryptographic algorithm, such as a block cipher. In various embodiments, one or more keys may be used by bit encoder/decoder 114 to encrypt/decrypt data, such as in conjunction with a block cipher. For example, bit encoder/decoder 114 may utilize a key to encrypt a data block 108 or a metadata block prior to storage in a storage memory device 104 or management memory device 105 respectively and to decrypt data retrieved from a storage memory device 104 or management memory device 105 to recover a data block 108 of memory line 106 or metadata block. Some embodiments may include separate encryption and decryption components within bit encoder/decoder 114. In various embodiments, the encryption and decryption operations performed by bit encoder/decoder 114 may be inverse operations. In some embodiments, the encryption and decryption operations may be symmetric operations.

In a particular embodiment, the block cipher input and output blocks are the same size. In many embodiments, the block cipher input block may match the bit size of a data block 108 of memory line 106 and/or the bit size of a metadata block associated with memory line 106. In one or more embodiments, the block cipher output may match a bit size of a storage memory device or management memory device. In an example, the block cipher output matches a memory device size for a row of a stored memory line. In various embodiments disclosed herein, plaintext may be used to refer to one or more of decoded, nonencrypted, de-diffused, and/or decrypted data blocks or correction blocks while ciphertext may be used to refer to one or more of encoded, diffused, and/or encrypted data blocks or correction blocks.

In many embodiments, comparator 116 may be used to verify whether data has become corrupted, e.g., during a memory read. For instance, comparator 116 may compare values, such as error correction codes generated by MB generator 118 to corresponding data blocks to ensure data has not changed. In various embodiments, comparator 116 may perform one or more entropy tests on read data to identify errors in read data. Comparator may also provide information associated with error identification.

In many embodiments, MB generator 118 may be used to generate values (e.g., error correction codes) that enable error detection and correction for memory module 102. In some embodiments, the error correction codes include or are based on parity bits. In various embodiments, MB generator 118 may provide two-way operation such that any data transformations performed by MB generator 118 may be reversible. In one or more embodiments, MB generator 118 may generate an error correction code by performing logical operations on portions of memory line 106. For instance, an error correction code may be generated by bitwise XORing plaintext from each of data blocks 108 together. XOR operators or operations may be advantageously used to generate error correction codes because XOR operations are order independent (commutative and associative) and there is no overflow/carry (i.e., input and output are the same size). Also, an XOR operation may be the same as an addition operation on integers modulo 2. However, additional or alternative data transformation may be used by MB generator 118 to generate an error correction code. For example, in some embodiments the MB generator 118 may perform addition, subtraction, multiplication, division, or other operations (e.g., to data blocks 108), but such operations may cause overflow/underflow and/or carry values. Thus, such operations may only be suitable for some data (e.g., small numbers) unless the overflow/underflow and carry values are accounted for. In another example, additional transformations may be performed along with an XOR operation, such as additional bit permutations or even full diffusion with encryption. In a further example, lossless compression may be used to generate error correction codes. In other examples, Hamming codes, code book substitutions, or similar techniques may be used to generate error correction codes.

In various embodiments, DE manager 112 may store a respective metadata block containing an error correction code in management memory device 105 for each memory line 106 stored in the set of storage memory devices 104. In one or more embodiments, bit encoder/decoder 114 may encode and/or encrypt the metadata blocks prior to storing them in management memory device 105. In various embodiments described herein, the error correction codes of the metadata blocks may be used to correct bit errors in a memory line read from memory module 102. Exemplary error correction flows will be described in more detail below in connection with FIGS. 3-5.

Figure 2:
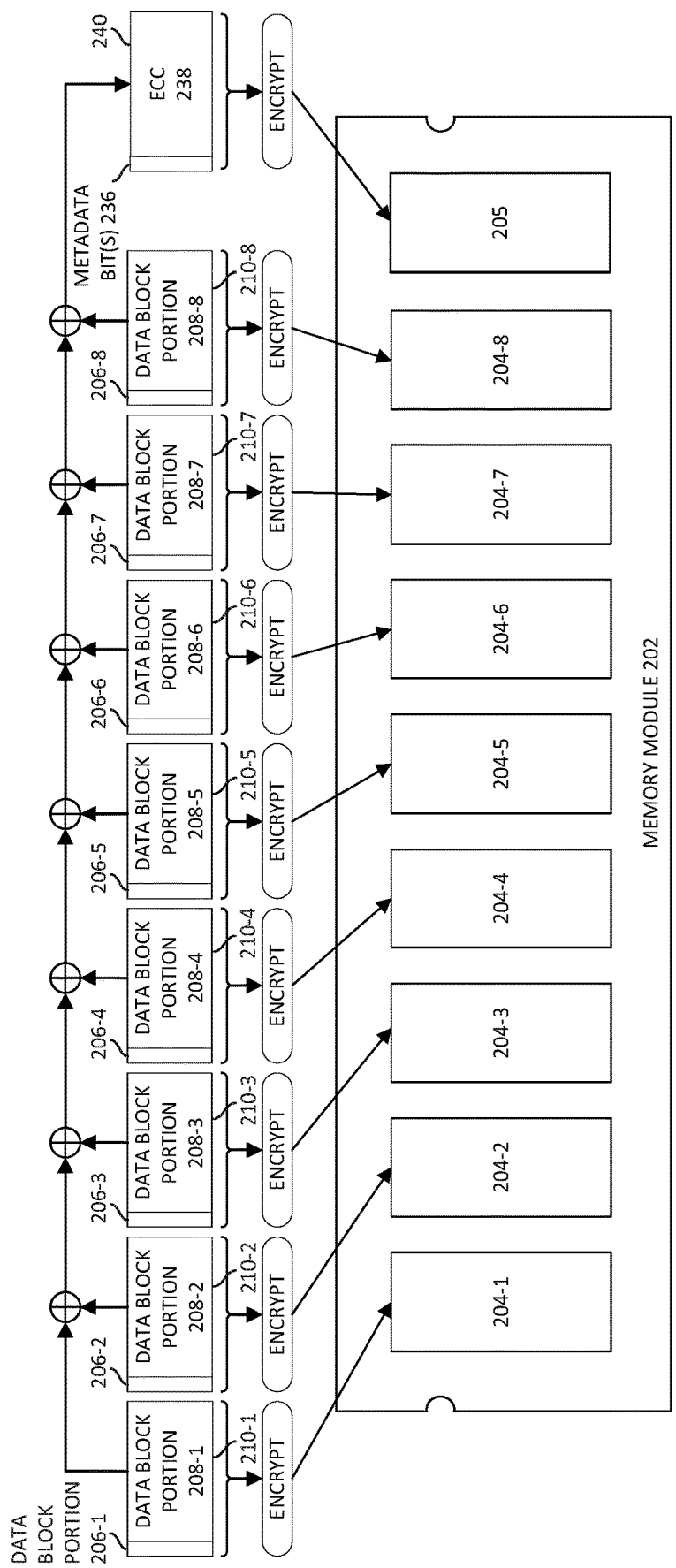
FIG. 2 illustrates a flow for generating a metadata block including an error correction code and storing an encrypted metadata block and encrypted data blocks in accordance with certain embodiments.

FIG. 2 illustrates a flow for generating a metadata block and storing an encrypted metadata block and encrypted data blocks in accordance with certain embodiments. The generation of the metadata block and storage of the encrypted metadata block and encrypted data blocks may occur during a write flow of a memory line (e.g., 106) to a memory module 202. In various embodiments, one or more components illustrated in FIG. 2 may be the same or similar to one or more components in FIG. 1. For instance, memory module 202 may have any one or more characteristics of memory module 102, management memory device 205 may have any one or more characteristics of management memory device 105, the data blocks 210 (i.e., 210-1, 210-2, etc.) may have any one or more characteristics of data blocks 108, and the metadata block 240 may have any one or more characteristics of a metadata block described in connection with FIG. 1.

In various embodiments, the flow of FIG. 2 may be performed by memory controller 110 (e.g. utilizing DE manager 112), memory controller 110 in conjunction with circuitry coupled to memory controller 110, and/or other suitable circuitry. In one or more embodiments described herein, metadata block 240 may be generated based on each of data blocks 210 (e.g., of a memory line). In one or more such embodiments, metadata block 240 may facilitate one or more of error detection, location, correction, encryption, and integrity for data stored in memory module 202. Embodiments are not limited in this context.

In many embodiments, the data blocks 210 collectively constitute a memory line, such as an evicted cache line that is to be stored in memory external to a host, such as memory module 202. For instance, the memory line may be evicted from a processor cache of the host. In one example, the memory line may include 64 bytes while each of data blocks 210 include 64 bits. In other embodiments, the memory line and each of data blocks 210 may be any other suitable size (e.g., 128 bytes and 128 bits respectively). In various embodiments, each of data blocks 210 may represent a row of the memory line. In some embodiments, data blocks 210 may collectively include the plaintext of the memory line. In one or more embodiments, each of data blocks 210 may be the same size. In a particular embodiment, metadata block 240 is the same size as each of data blocks 210.

In some embodiments, during a write operation to memory module 202, at least a portion of the bits of each of data blocks 210 may be XORed together to generate XORed plaintext of the error correction code 238 of the metadata block 240. In various embodiments, a reduced-length parity value is calculated over only a portion of the bits (e.g., data block portions 208) of data blocks 210 to generate error correction code 238, while a remaining portion of the bits (e.g., data block portions 206) are not involved in the parity calculation. As an example, if each of the data blocks 210 is X bits wide, the metadata block 240 is X bits wide, and S metadata bit(s) 236 are stored in the metadata block 240; then the parity may be calculated (e.g., by performing an XOR operation) over X-S bits of each data block 210 (e.g., the most significant X-S bits, the least significant X-S bits, or any other suitable X-S bits of each data block) to generate an X-S bit error correction code 238 (the bits of the data blocks used to generate the error correction code 238 may, but are not required to, be in the same position within each data block 210). For example, if metadata bit(s) 236 includes 1 metadata bit and the data blocks 210 and metadata block 240 are each 64 bits wide, a 63-bit parity value for the error correction code 238 may be calculated by XORing 63 bits of each of the data blocks 210; if metadata bit(s) 236 includes 2 metadata bits, the parity value for the error correction code 238 may be calculated by XORing 62 bits of each of the data blocks 210; and so on. In particular embodiments, S may be any reasonably low integer (e.g., 1-4 bits), although S may alternatively be a higher integer in other embodiments. In some embodiments, the number of metadata bits (S) per metadata block 240 may be user configurable to allow flexibility based on the application.

Although the figure depicts a partial length parity calculation (e.g., that may be performed for all or some of the memory lines stored in memory module 202), in other embodiments full length parity calculations may be used and the metadata bits 236 for various memory lines stored in memory module 202 may instead be stored on an additional management memory device 105 (or the metadata bits 236 may be interspersed with the error correction code 238 across two or more management memory devices 105). Such embodiments may still benefit from various techniques (e.g., error detection and correction techniques) described herein despite not benefiting from the reduced footprint that a single management memory device 105 provides.

Any suitable data may be stored in the metadata bit(s) 236 of metadata blocks 240. The metadata bit(s) 236 may be data distinguished from the error correction code 238 (e.g., metadata bit(s) 236 are not parity bits, or at least are not parity bits from the same calculation used to generate error correction code 238). In some embodiments, metadata bit(s) 236 of a metadata block 240 comprise metadata for the memory line corresponding to the metadata block 240.

Metadata bit(s) 236 may include any suitable metadata. As one example, metadata bit(s) 236 may comprise one or more locator bits for identifying a bad memory device (e.g., a memory device in which one or more errors have occurred) from among the memory devices 204 and 205 (e.g. using a Reed-Solomon code), a poison bit for the memory line corresponding to the particular metadata block 240 (e.g., the poison bit may be set if an error is detected in the memory line and the error is uncorrectable by the memory controller 110), one or more directory bits (for use in cache coherency schemes to identify a location, e.g., a different semiconductor package, in which the memory line is cached), one or more encryption bits specifying whether and/or how the memory line is encrypted, one or more key identifier bits specifying a key used for encrypting the memory line, one or more wear leveling bits associated with an address of the memory line, or other suitable metadata. Some systems may utilize cryptographic MACs for memory integrity (e.g. KMAC, GMAC, or HMAC), which enable a variety of usages including data corruption detection, memory access control, virtual machine (VM) isolation, and others. Such systems utilizing MACs may utilize separate metadata stored for each memory line in the metadata bit(s) 236 of the correction block corresponding to the memory line.

The metadata of metadata bit(s) 236 may be consumed by the memory module 202 or by one or more components of a host computing system that utilizes the memory module 202 to store data (e.g., the memory controller 110 or a processor core).

In the illustrated embodiment, bit encoding operations may include encryption operations. In one or more embodiments, data blocks 210 may be encrypted (e.g., via bit encoder/decoder 114 with a block cipher having a block size the same as the size of each of data blocks 210) and the encrypted data blocks may be stored in respective storage memory devices 204. For example, encrypted data block 210-1 (including portions 206-1 and 208-1) may be stored in storage memory device 204-1, encrypted data block 210-2 (including portions 206-2 and 208-2) may be stored in storage memory device 204-2, encrypted data block 210-3 (including portions 206-3 and 208-3) may be stored in storage memory device 204-3, and so on through encrypted data block 210-8 (including portions 206-8 and 208-8) being stored in storage memory device 204-8. In various embodiments, metadata block 240 (including the metadata bit(s) 236 and the error correction code 238) may be encrypted (e.g., via bit encoder/decoder 114 with a block cipher) and stored in management memory device 105. In other embodiments, metadata block 240 and/or data blocks 210 may be diffused instead of encrypted. In some embodiments, one or more of error detection, location and/or correction may be provided for data stored in memory module 202, however, security and/or integrity may not be guaranteed for data stored in memory module 202 (e.g., the data blocks 210 and/or metadata block 240 may be written to memory devices 204 and/or 205 in an unencrypted state). In various embodiments, data may be written or stored to memory module 102 through memory controller 110.

As previously mentioned, in many embodiments, the block cipher input block may match the bit size of a data block of the memory line 306. For instance, Simon, Speck64, Prince, Data Encryption Standard (DES), or Triple DES (3DES) may represent ciphers that match the 64-bit data block size for DDR5 memory. In another instance, Simon32 or Speck32 may represent ciphers that match the 32-bit block size for DDR4 memory devices. In yet another instance, advanced encryption standard (AES) may be used, such as in conjunction with storage memory devices with a device density of 128 bits per transaction. In other embodiments, other ciphers for any suitable block size may be used. In embodiments in which security is not critical, or security is not as important as performance, reduced round block ciphers may be used (e.g., 2 rounds of AES instead of the recommended 10 rounds, etc.). In one or more embodiments, the block cipher output may match a bit size (e.g., number of bits) of a memory device (e.g., a storage memory device 204 and/or management memory device 205). For instance, the block cipher output size may match the size of a row of a memory device 204 or 205. Thus, the block cipher output size may correspond to the bits of a memory line stored by a single memory device (e.g., 204).

In various embodiments, encryption may be performed using a secret key. In some embodiments, encryption may be performed in accordance with multi-key total memory encryption (MKTME). In some such embodiments, the key to use in encryption operations may be determined, (e.g., by memory controller 110, DE manager 112, or other circuitry) based on address bits (e.g., one or more address bits of a logical or physical address of the particular memory line being encrypted) or other metadata that indicates which key to use. In some instances, usage of an incorrect key to decrypt data may result in an integrity violation and/or uncorrectable error. In various embodiments, the use of a wrong key may be detected in addition to or in place of detecting bit errors. Furthermore, in one or more embodiments, xor-encrypt-xor based tweaked-codebook mode with ciphertext stealing (XTS) mode, or other tweakable modes such as Liskov, Rivest, and Wagner (LRW), may be used to encrypt a data block 210. In one or more embodiments, XTS mode may be used and the physical memory address of each data block 210 is used as an additional tweak so that all ciphertext data blocks will look different for different addresses.

Figure 3:
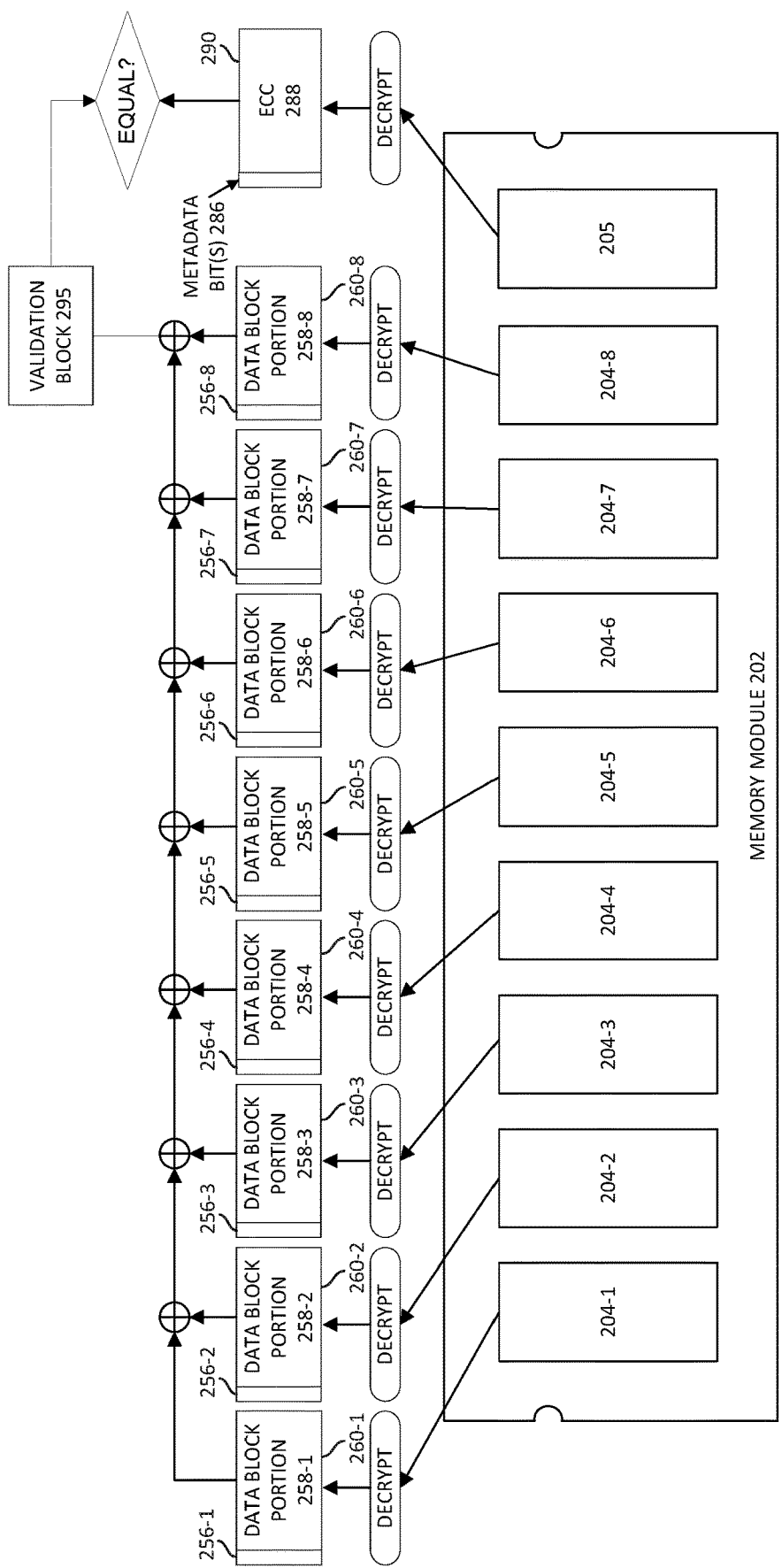
FIG. 3 illustrates a flow for identifying a data error in accordance with certain embodiments.

FIG. 3 illustrates a flow for identifying a data error in accordance with certain embodiments. The flow of FIG. 3 may be representative of a read flow from memory module 202. In various embodiments, one or more components illustrated in FIG. 3 may be the same or similar to one or more components in FIG. 1 or FIG. 2. For instance, data blocks 260 (i.e., 260-1, 260-2, etc.) may have any one or more characteristics of data blocks 108 or data blocks 210, and the metadata block 290 may have any one or more characteristics of the metadata block 240 of FIG. 2. In various embodiments, the flow of FIG. 3 may be performed by memory controller 110 (e.g. utilizing DE manager 112), memory controller 110 in conjunction with circuitry coupled to memory controller 110, and/or other suitable circuitry.

In one or more embodiments, data associated with a memory line (e.g., the data stored in memory module 202 as part of the flow of FIG. 2) may be read from memory module 202 and decrypted. For example, data may be read from management memory device 205 and decrypted to generate metadata block 290 and data may be read from storage memory devices 204-1 through 204-8 and decrypted to generate data blocks 260-1 through 260-8 (which may be in plaintext format). In an embodiment, at least a portion of each decrypted data block 260 may be used to generate a validation block 295 that is compared to at least a portion (e.g., error correction code 288) of the metadata block 290 to verify integrity and/or correctness of the data. Embodiments are not limited in this context.

In some embodiments, the portions 258 (e.g., 258-1 through 258-8) of each of decrypted data blocks 260 are XORed together to generate XORed plaintext to form validation block 295. The portions of the decrypted data blocks 260 that are XORed may be the same portions that were XORed to form the error correction code when the data blocks were written to memory module 202. In some embodiments, the error correction code 288 of metadata block 290 and the validation block 295 may be compared to determine if they are equal. For instance, the error correction code 288 of metadata block 290 and the validation block 295 may be compared by comparator 116. If the error correction code 288 of metadata block 290 and the validation block 295 are equal, it may be determined that no bit error or data corruption has occurred for the memory line. However, if the error correction code 288 of metadata block 290 and the validation block 295 are not equal, it may be determined that one or more bit errors or data corruption have occurred. In various embodiments, when a bit error or data corruption is detected, an error correction flow may be entered. Various examples of error correction flows are described in connection with FIG. 4 and FIG. 5.

Figure 4:
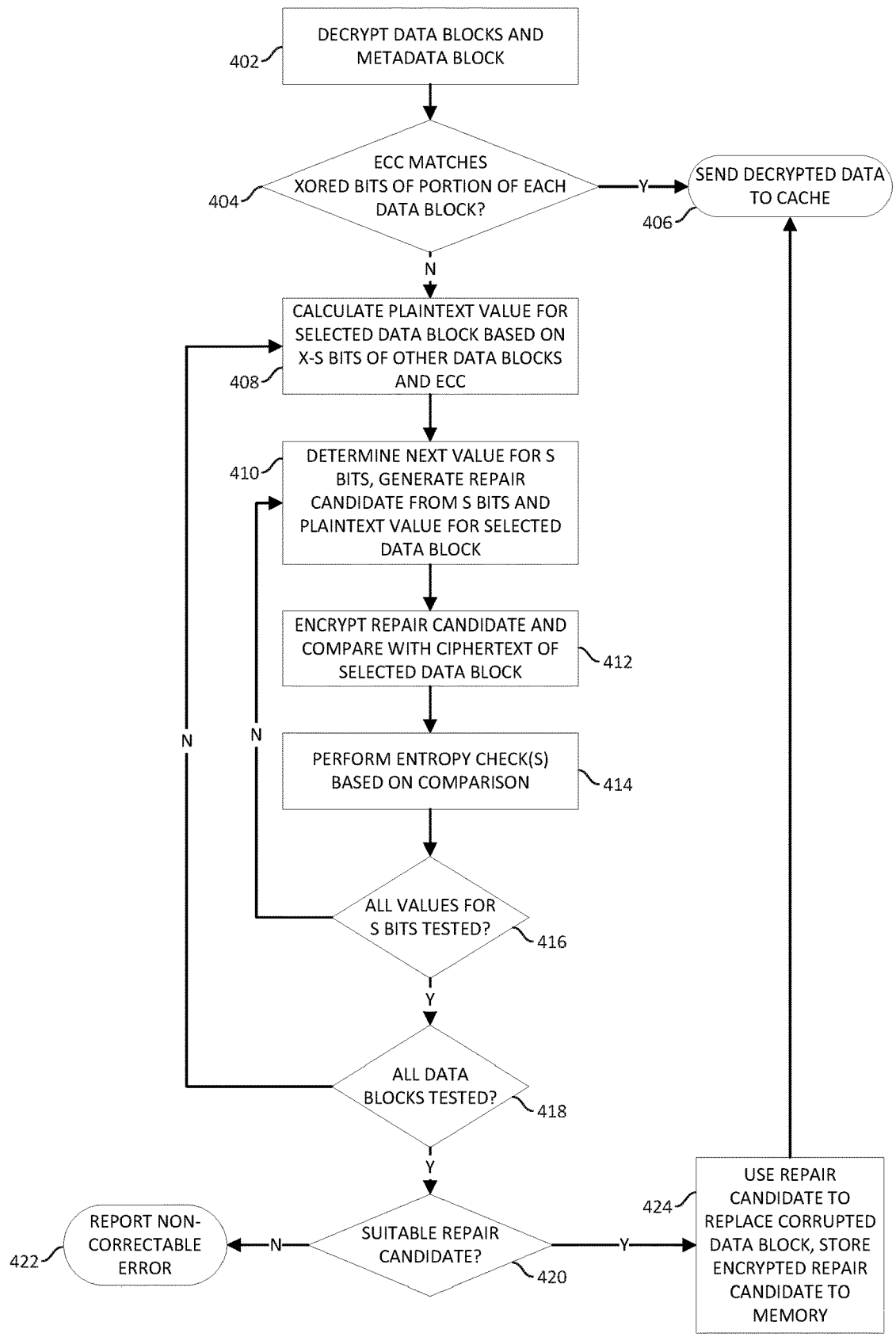
FIG. 4 illustrates a flow for locating and correcting a data error in accordance with certain embodiments.

FIG. 4 illustrates a flow for identifying and correcting a data error in accordance with certain embodiments. The flow may describe operations that may be executed by or implemented by any one or more components of system 100 (e.g., memory module 102, memory controller 110, or data error manager 112) or other suitable circuitry. The flow may reference various components of FIGS. 1-3, although the flow may be adapted for use with any suitable data sets, controllers, and/or memory devices. The flow of FIG. 4 may be performed in response to a read operation to retrieve, e.g., a memory line (e.g., the read operation may be issued by a host computing device in response to a cache miss).

At 402, data blocks and a metadata block are read from memory and decrypted. For example, encrypted data blocks and an encrypted metadata block may be read from storage memory devices 204 and management memory device 205 respectively. The blocks may then be decrypted to generate plaintext data blocks 260 and plaintext metadata block 290. In a particular embodiment, bit encoder/decoder 114 may perform the decryption based on a block cipher.

At 404, a determination is made as to whether an error correction code (e.g., 288) of the decrypted metadata block matches a value (e.g., validation block 295) that is generating by XORing a portion of each data block. For example, the portions 258 of each data block (e.g., the bits in the same positions of the data blocks that were used to generate the error correction code 238 during the write flow) may be XORed with each other and compared against the error correction code 288.

If the error correction code matches the XORed portions of the data blocks, the data of the data blocks is assumed to be accurate and the decrypted data is sent to a memory cache (or to another suitable component that requested the data depending on the particular implementation) at 406. In various embodiments, because only a portion of the bits of each data block are compared with respect to the parity bits, there is a chance that, even if the error correction code matches the XORed bits from the data blocks, an error may be present in one of the bits that is not compared against the parity bits (e.g., an error may be present in one of the portions 256 of a data block 260 of the memory line being read). However, for reasonably small values of S (e.g., 1, 2, 3, or 4), the probability of this event is extremely low due to diffusion properties of block ciphers. The probability of this event may be calculated as:

$$\frac{\text{number on incorrect combinations with matching }(X-S)\text{ bits}}{\text{total number of combinations}} = \frac{2^S - 1}{s^X}$$

For example, assuming a large data center with an average data corruption rate of one corruption per second, data block lengths of X=64, and error correction code length of 60 (i.e., S=4), it may take $(2^{64})/(2^4-1)$ seconds on average to see an undetected corruption. This is approximately 39 billion years. Even if the data corruption rate was increased to one billion corruptions per second, the expected rate of undetected corruptions would be once every 39 years.

If the error correction does not match the XORed bits at 404, then an error correction flow may be initiated. In various embodiments, an error correction flow may involve testing the data blocks 260 retrieved from the memory devices 204 one at a time in a trial and error approach. For instance, the data blocks may be tested starting with data block 260-1 (the decrypted data read from memory device 204-1). Data block 260-2 (the decrypted data read from memory device 204-2) may then be tested and so on until data block 260-8 (the decrypted data read from memory device 204-8) is tested. In various embodiments, the metadata block 290 (the decrypted data read from management memory device 205) may also be tested.

In a particular embodiment, a data block may be tested as follows. At 408, a plaintext value for the selected data block may be calculated based on X-S bits of the other data blocks and the error correction code of the decrypted metadata block. For example, if data block 260-1 is being tested for errors, a plaintext value may be computed by XORing data portions 258-2 through 258-8 and error correction code 288 together. As another example, if data block 260-2 is being tested for errors, a plaintext value may be computed by XORing data portion 258-1, data portions 258-3 through 258-8, and error correction code 288 together.

If a data block (e.g., 260-1) is the only block containing an error, then the resulting plaintext value would provide recovery of X-S bits of the original value of the data block (e.g., portion 208-1 of data block 210-1). However, because in various embodiments the error correction code does not include parity bits for the remaining portion (S bits) of the data block 260-1, rather other metadata bits are stored in the metadata block, further processing may be used to test the entire data block for errors and to recover this remaining portion if the error is determined to have occurred in a particular data block.

Accordingly, as the depicted flow shows, the possible values for the S metadata bits (e.g., portion 256-1) are iterated through with each iteration being combined with the plaintext value computed at 408 and each combination tested separately. This may include iterating through $2^S$ possible combinations for the S bits. Thus at 410, a speculative value for the S bits is determined and a repair candidate is generated using this speculative value along with the plaintext value computed at 408. For example, if S=2, the first speculative value chosen for the S bits may be 00, the next speculative value (e.g., when the flow reaches 410 again) may be 01, and then 10, and finally 11. The speculative value for the S bits is appended to (or otherwise combined with) the plaintext value computed at 408 (thus the same plaintext value computed at 408 is used with each different value for the S bits) to yield a repair candidate that is a plaintext value that is X bits long.

At 412, the repair candidate is encrypted using the same encryption technique used during the write flow when the corresponding data block was encrypted prior to being stored in the corresponding storage memory device. As just one example, XTS with a tweak corresponding to the memory address for the data block under test (e.g., 260-1) and a secret key may be used for the encryption of the repair candidate. The encrypted repair candidate is then compared against the ciphertext of the selected data block (e.g., the encrypted value that was read from the corresponding storage memory device 204 before the value was decrypted to generate the data block under test). In a particular embodiment, the comparison may yield a value that is X bits long, with any differences in corresponding bits resulting in bits that are set in the comparison value.

At 414, one or more entropy checks are performed based on the comparison between the encrypted repair candidate and the encrypted data block (i.e., ciphertext of selected data block) read from the memory device. Various examples of entropy checks will be discussed in more detail in connection with FIG. 5, but as one example, the resulting number of bits set in the comparison value may be counted (where each set bit indicates a difference between the corresponding bits in the encrypted repair candidate and the ciphertext of the selected data block). In one example, if the number of bits set is below a threshold number, then it may be likely that the selected data block is in error and the top S bits were assumed correctly. This conclusion may be based on the assumption that most errors are not random (for instance, single bit errors and failures related to data pins of a memory device). If there is a large number of bits set (e.g., roughly half of the bits are flipped), then the repair candidate is likely not the correct repair candidate (e.g., the repair candidate could have been based on an incorrect combination of S bits). An entropy score associated with the repair candidate may be recorded (where the entropy score may indicate a likelihood that the selected data block is in error and that the repair candidate is the correct value to be used to repair the data block).

At 416, a determination is made as to whether all speculative values for the S bits have been tested. If any speculative values for S bits have not been tested (e.g., combined with the plaintext value computed at 408 and then encrypted to generate a repair candidate for comparison with a value read from a memory device), the flow returns to 410 where a new speculative value for the S bits is determined.

If all speculative values for the S bits have been tested, the flow moves to 418 where a determination is made as to whether all data blocks have been tested. If any data blocks have not yet been tested, an untested data block is selected at 408. For example, block 260-2 may be selected after testing on block 260-1 is complete. A plaintext value for block 260-2 may be generated based on X-S bits of the non-selected data blocks and the error correction code of the metadata block. For example, a plaintext value may be computed by XORing data portions 258-1, 258-3 through 258-8, and the error correction code 288 together. Repair candidates for block 260-2 may be generated in succession by iterating through speculative values for the S bits as described above and each repair candidate may be encrypted and compared against the encrypted value of block 260-2, and one or more entropy checks may be performed on each comparison. The flow may cycle through each data block in like manner. The flow may also test the metadata block in a similar manner. For example, when the metadata block is selected, a plaintext value may be computed by XORing data portions 258-1 through 258-8 together. The speculative values for the S bits may be each be iterated through and combined with this plaintext value and the resulting repair candidates may be tested in a manner similar to that described above to perform entropy checks on the repair candidates.

Once a determination has been made at 418 that all blocks have been tested, a determination is made as to whether a suitable repair candidate was found. This determination will be discussed in more detail in connection with FIG. 5. As one example, if the tests of the flow indicate that one particular repair candidate was very likely to have an error, but no other repair candidates were likely to have an error, that repair candidate would be determined as a suitable repair candidate. The repair candidate would then be used to replace the corrupted data block 260 and the encrypted repair candidate would be written to the corresponding memory device over the corrupted encrypted value that was read from the memory device in an attempt to correct the error(s). The data blocks 260 (including the repair candidate for the replaced data block) would then be sent to the cache at 406.

If instead a determination is made at 418 that no suitable repair candidate exists, a report that a non-correctible error occurred may be made. For example, the memory line may be poisoned (which may include setting one or more bits 286 to indicate the memory line is poisoned) and/or an error report may be sent to the host. In one embodiment, memory controller 110 may raise an interrupt to signal to the host that there was an uncorrectable error. In some embodiments, the memory line (with the corrupted data) is returned to the host computing device. In one example, the host computing device may attempt to correct the corrupted data (e.g., by executing a sequence in software).

Some of the operations illustrated in FIG. 4 may be repeated, combined, modified or deleted where appropriate, and additional steps may also be added to the flow in various embodiments. Additionally, steps may be performed in any suitable order without departing from the scope of particular embodiments. In various embodiments, multiple data blocks and/or the metadata block may be tested serially (e.g., as depicted) or in parallel, e.g., via logic replication or pipelining. In some embodiments, multiple repair candidates for the same data block may be tested serially (as depicted) or in parallel.

Figure 5:
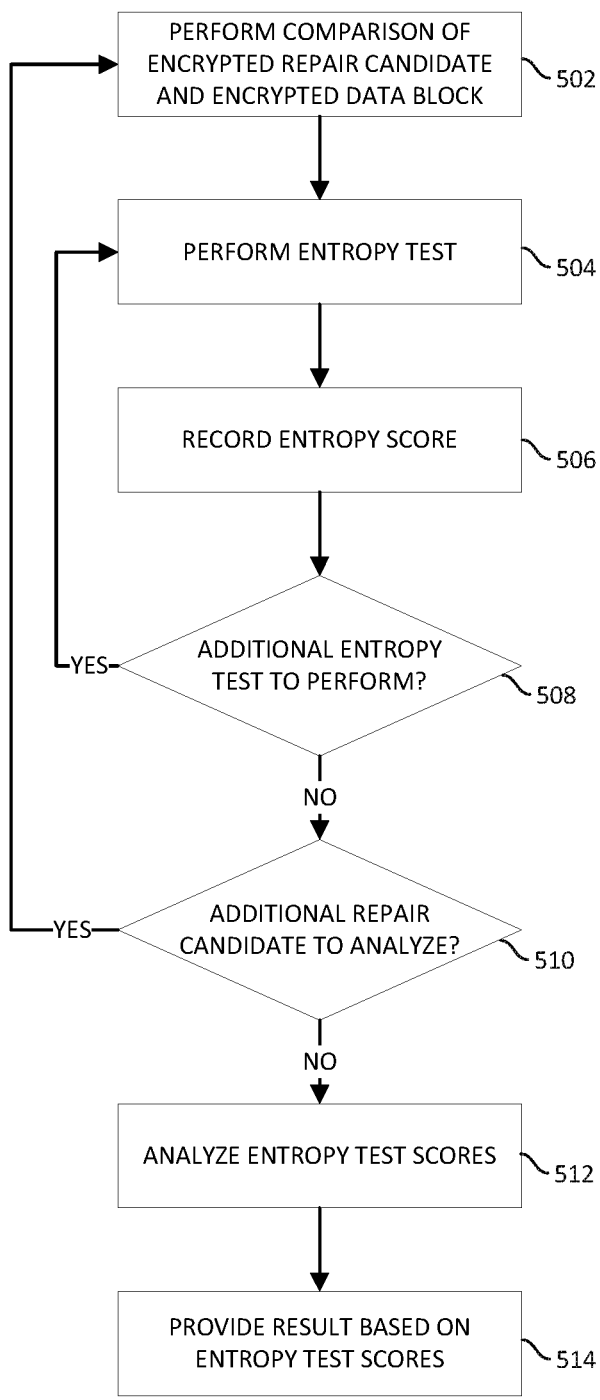
FIG. 5 illustrates a flow for analyzing data errors in accordance with certain embodiments.

FIG. 5 illustrates a flow for analyzing data errors in accordance with certain embodiments. The flow may describe operations that may be executed by or implemented by any one or more components of system 100 (e.g., memory module 102, memory controller 110, or DE manager 112) or other suitable circuitry. The flow may reference various components of FIGS. 1-3, although the flow may be adapted for use with any suitable data sets, controllers, and/or memory devices. The flow may be performed in response to a read operation to retrieve, e.g., a memory line (e.g., the read operation may be issued by a host computing device in response to a cache miss). In a specific embodiment, the flow may be performed in response to a determination that an error exists in a memory line read from memory module 202 (e.g., in response to a determination that an error correction code (e.g., 288) does not match XORed bits of corresponding portions (e.g., 258-1 through 258-8) of data blocks (e.g., 260-1 through 260-8).

At 502, a comparison of an encrypted repair candidate and an encrypted data block (e.g., ciphertext of a selected data block) is performed. For example, an encrypted data block read from memory is compared against an encrypted repair candidate as described above (e.g., in connection with 412 of FIG. 4).

At 504, an entropy test is performed based on the comparison and at 506 and entropy score is recorded. An entropy test may determine a quantified entropy between the encrypted repair candidate and the encrypted data block. Any suitable entropy test may be performed. In a first example, the entropy test may determine the number of bits that are different between the encrypted repair candidate and the encrypted data block through a bitwise comparison (e.g., by XORing the encrypted repair candidate with the encrypted data block and summing up the number of bits that are set in the result). An entropy score may be determined based on the number of bits that are different as indicated by the comparison. In some embodiments, the entropy score may be retrieved from a lookup table using the number of bits that are different as an input to the lookup table. One example scoring schema for such a lookup table is shown below for an entropy test of a 64-bit encrypted repair candidate and 64-bit encrypted data block (though in various embodiments, the entropy scores for any particular number of bits may be programmable, e.g., by a user):

| Number of Bit Flips | Probability | Entropy Score |
| --- | --- | --- |
| 0 or 64 | 1.08E-19 | 100 |
| 1 or 63 | 6.94E-18 | 100 |
| 2 or 62 | 2.19E-16 | 95 |
| 3 or 61 | 4.25E-15 | 90 |
| 4 to 19, 45 to 60 | 1.56E-03 | 50 |
| 20 to 44 | 9.98E-01 | 20 |

According to such an embodiment, lower probability outcomes (i.e., very low or high number of bit differences) may result in higher entropy scores while more common outcomes may result in lower entropy scores.

In one or more other example entropy tests the bits of the comparison may be mapped to a data pin (e.g., a DQ pin) of the memory device (e.g., 204 or 205) from which the encrypted data block was read, where a data pin may be a connector of a memory device that receives a portion of the memory line or the metadata block when data is written to the memory device. For example, assuming a 4-pin memory device and a 64-bit memory line, 16 bits of the memory line may be written to the memory device using each data pin. An entropy test may utilize this mapping to determine an entropy score. For example, if the errors (e.g., bit flips in the comparison) are isolated to bits associated with a particular data pin (and no errors are found in the bits associated with the other data pins), it may be likely that a malfunction with the particular data pin has resulted in the errors and a relatively high entropy score may be determined for the encrypted repair candidate.

In one example, an entropy test may determine an entropy score based on the likelihood that failure of one data pin has resulted in errors to the encrypted data block. For example, if errors are present for bits corresponding to one data pin, but no errors are present for bits corresponding to the other data pin(s), the entropy test may assign a relatively high entropy score to the encrypted repair candidate. In some embodiments, the entropy score may vary based on the number of errors that are present for the one data pin when no errors are found on the other data pin(s) (e.g., higher entropy scores may be assigned for relatively low or high number of errors).

In another example, an entropy test may determine an entropy score based on the likelihood that failure of two data pins has resulted in errors to the encrypted data block. For example, if errors are present for bits corresponding to two data pins, but no errors are present for bits corresponding to the other data pin(s), the entropy test may assign a relatively high entropy score to the encrypted repair candidate. In some embodiments, the entropy score may vary based on the number of errors that are present for the two data pins when no errors are found on the other data pin(s) (e.g., higher entropy scores may be assigned for relatively low or high number of errors).

In another example, an entropy test may determine an entropy score based on the likelihood that failure of any particular number of data pins has resulted in errors to the encrypted data block. For example, if errors are present for bits corresponding to the particular number of data pins, but no errors are present for bits corresponding to the other data pin(s), the entropy test may assign a relatively high entropy score to the encrypted repair candidate. In some embodiments, the entropy score may vary based on the number of errors that are present for the particular number of data pins when no errors are found on the other data pin(s) (e.g., higher entropy scores may be assigned for relatively low or high number of errors).

In another example, an entropy test may determine a score based on the likelihood that failure of any particular number of adjacent data pins (e.g., two adjacent data pins) has resulted in errors to the encrypted data block. For example, if errors are present in bits corresponding to the particular number of adjacent data pins, but no errors are present for the bits corresponding to the other data pin(s), the entropy test may assign a relatively high entropy score to the encrypted repair candidate. In some embodiments, the entropy score may vary based on the number of errors that are present for the particular number of adjacent data pins when no errors are found on the other data pin(s). In some embodiments, errors on adjacent data pins may signify that half of a device has failed and may result in a higher entropy score than other entropy tests indicating, e.g., that one data pin has failed or two non-adjacent data pins have failed. In one embodiment, a determination that one data pin has failed may result in a higher entropy score than a determination that two separate data pins have failed (e.g., when the failures on the two separate data pins do not indicate a half device failure). However, the entropy scores may be configurable by the user, so any suitable scoring scheme may be used. For example, DE manager 112 may include updatable firmware that configures the DE manager to implement any number of entropy tests and associated scoring methodologies based on differing fault models.

In yet another example, the bits of the comparison may each be mapped to a location (e.g., a row and column) of the memory device (e.g., 204 or 205) from which the encrypted data block was read. An entropy test may utilize this mapping to determine an entropy score. For example, if the errors (e.g., bit flips in the comparison) are isolated to a bounded geographical region, a relatively high entropy score may be determined even if the overall number of bits that are flipped would have resulted in a lower entropy score. In one embodiment, an entropy score based on errors in a bounded geographical region may be lower than an entropy score based on a determination that one or more data pins failed (however, the entropy scores may be configurable by the user, so any suitable scoring scheme may be used).

In various embodiments, any suitable entropy test(s) may be used. For example, entropy tests may look for patterned, periodic, or clustered bit flips (e.g., due to a bad wire or stuck-at-fault, half of the device bits matching exactly but the other half containing flipped bits, or the bits corresponding to the boundary of a bank are flipped), or flipped bits being together in a group or cluster within a threshold defined cluster size and/or alignment, or any combination of multiple thresholds for various measurements of the entropy of the compared ciphertext. In various embodiments, thresholds, scores, and/or the specific entropy test(s) utilized may be set based on usage/customer requirements and/or may be user configurable.

At 508, a determination is made as to whether an additional entropy test is to be performed for the encrypted repair candidate (and its associated encrypted data block). In various embodiments, a single entropy test or multiple entropy tests may be performed for each encrypted repair candidate. If multiple tests are to be performed for an encrypted repair candidate, the flow may cycle through operations 504 and 506 for each entropy test to be performed. Two or more entropy tests may be performed serially and/or in parallel.

At 510, a determination is made as to whether an additional repair candidate is to be analyzed. If so, the flow returns to 502 and one or more entropy tests are performed for a new encrypted repair candidate. In various examples, the flow may cycle through all repair candidates for all data blocks (e.g., 260) of a memory line and the encrypted metadata block 290.

At 512, the entropy scores may be analyzed. This analysis may determine whether a suitable repair candidate exists based on the entropy scores. This determination may be performed in any suitable manner and in various embodiments any portion of the analysis may be user configurable.

In a particular embodiment, if an entropy score is above a score threshold, the associated repair candidate may be selected as a suitable repair candidate. In some embodiments, a repair candidate with an entropy score above a first score threshold may only be selected as the repair candidate if no other entropy score is above the first score threshold and/or no other entropy score is above a second threshold that is lower than the first threshold.

In various embodiments, one or more metrics may be computed based on one or more of the entropy scores and used during the analysis to determine whether a suitable repair candidate exists. For example, an average of the entropy scores, an average of a portion of the entropy scores (e.g., with outliers being excluded from the average), a maximum of the entropy scores, a standard deviation (or a multiple of a standard deviation), a difference in the value of the highest entropy score and the next highest entropy score, a difference in the value of the highest entropy score and another metric such as an average of one or more of the other entropy scores may be used to determine whether a suitable candidate exists or to determine a confidence level for the selection of a suitable candidate (where the confidence level indicates the likelihood that the selected candidate is indeed the only candidate with one or more errors).

In particular embodiments, only the highest entropy score for each repair candidate is used during the analysis or during a portion of the analysis. For example, if multiple entropy tests were performed for a particular repair candidate, the highest score for the repair candidate may be used as the entropy score for the repair candidate. As another example, only the highest scores for each repair candidate (or a subset of the data blocks) may be used in calculating the confidence level for the selected repair candidate. In other embodiments, multiple entropy scores from multiple entropy tests may be used during any portion of the analysis to select a repair candidate and/or determine a confidence level. For example, a particular repair candidate's final entropy score that is compared against similar final entropy scores of other repair candidates may be a function of entropy scores from multiple entropy tests (e.g., an average of two or more of the entropy scores or other suitable combination of entropy scores).

In various embodiments, if a confidence level associated with the repair candidate selection of a repair candidate is not above a threshold level, a determination is made that a suitable repair candidate does not exist. For example, a low confidence level may be found if the repair candidate with the highest entropy score has a relatively low entropy score or the repair candidate with the highest entropy score does not appear sufficiently better than one or more of the other repair candidates (e.g., the next best repair candidate or a group of other repair candidates). In one particular embodiment, the confidence level for a particular repair candidate may be equal to an entropy score of the repair candidate divided by an average or a multiple of an average of entropy scores of the other repair candidates (optionally with one or more outliers removed).

In some embodiments, an error history may be used during the analysis to select a repair candidate and/or determine a confidence level associated with a selected repair candidate. For example, if a particular memory device 204 or 205 or a portion of a memory device (e.g., one or more data pins) have been associated with one or more previous errors, a data block read from that device or portion of that device may be considered more likely to include an error. Thus, one or more entropy scores and/or confidence scores for a repair candidate for a data block read from that particular device may be adjusted upwards (or the scoring algorithm may otherwise take the error history into account).

At 514 a result is provided based on the entropy scores. The result may include any suitable information. In one embodiment, the result may include an indication of a repair candidate that is to be used to repair the associated data block. In some embodiments, the result may include the entropy score for the repair candidate and/or the confidence level associated with the selection of the repair candidate. In various embodiments, information included within the result may be provided to circuitry within memory controller 110, DE manager 112, and/or circuitry of a host computing device. For example, the confidence level associated with the selection may be reported to the host computing device in association with the return of the memory line (which may or may not include the repair candidate as a replacement for the data block deemed to include error(s)), so as to alert the host computing device as to how likely the memory line is likely to include one or more errors. In some embodiments, confidence levels associated with a particular memory line, a group of memory lines, or a particular memory device may be tracked by DE manager to determine an overall health of a memory device or group of memory devices.

Some of the operations illustrated in FIG. 5 may be repeated, combined, modified or deleted where appropriate, and additional steps may also be added to the flow in various embodiments. Additionally, steps may be performed in any suitable order without departing from the scope of particular embodiments. In various embodiments, multiple data blocks and/or the correction block may be tested serially (e.g., as depicted in FIG. 5) or in parallel, e.g., via logic replication or pipelining. In some embodiments, multiple entropy tests may be performed serially or in parallel for a particular repair candidate.

In some embodiments, the flow of FIG. 5 may end before cycling through all possible repair candidates if one or more particular conditions are met. For example, if an entropy score for a particular repair candidate is above a particular threshold (indicating a very high likelihood that such a repair candidate included the detected error(s)), the flow may end and the repair candidate may be returned in the memory line to the host and used to repair the corrupted data block.

In various embodiments, the error detection and correction techniques described herein may be applied to data blocks that are not encrypted before being stored in memory module 102. For example, the plaintext data blocks and plaintext metadata block may be stored in the memory devices of the memory module. When the data blocks and metadata block are read from the memory module 102, if the validation block does not match the error correction code of the metadata block, then repair candidates may be formed as described above (e.g., by combining speculative values with XORed plaintext based on portions of the non-selected blocks). However, rather than encrypting the repair candidate and comparing it against the encrypted data block read from memory, the repair candidate may be compared with the plaintext data block read from memory and one or more entropy tests may be performed as described above. Any of the embodiments described above may be used to select a suitable repair candidate and/or a confidence level associated with the selected repair candidate.

Figure 6:
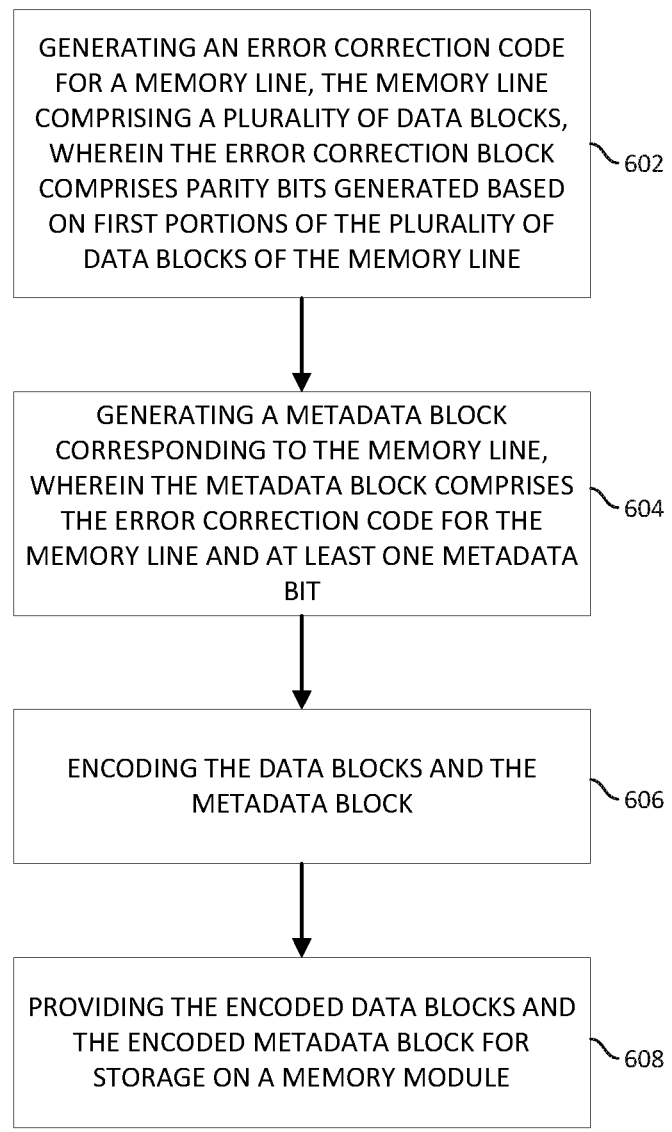
FIG. 6 illustrates an example flow for storing encrypted data blocks and an encrypted metadata block in accordance with certain embodiments.

FIG. 6 illustrates an example flow for storing encrypted data blocks and an encrypted error correction code in accordance with certain embodiments. The various operations of the flow may be performed by any suitable circuitry, such as a controller of a host computing device, a controller of a memory module, or other components of a computing device. At 602, an error correction code is generated for a memory line, the memory line comprising a plurality of data blocks, wherein the error correction code comprises parity bits generated based on first portions of the plurality of data blocks of the memory line. At 604, a metadata block corresponding to the memory line is generated, wherein the metadata block comprises the error correction code for the memory line and at least one metadata bit. At 606, the data blocks and the metadata blocks are encoded. At 608, the encoded data blocks and the encoded metadata block are provided for storage on a memory module.

Some of the operations illustrated in FIG. 6 may be repeated, combined, modified or deleted where appropriate, and additional steps may also be added to the flow in various embodiments. Additionally, steps may be performed in any suitable order without departing from the scope of particular embodiments.

Figure 7:
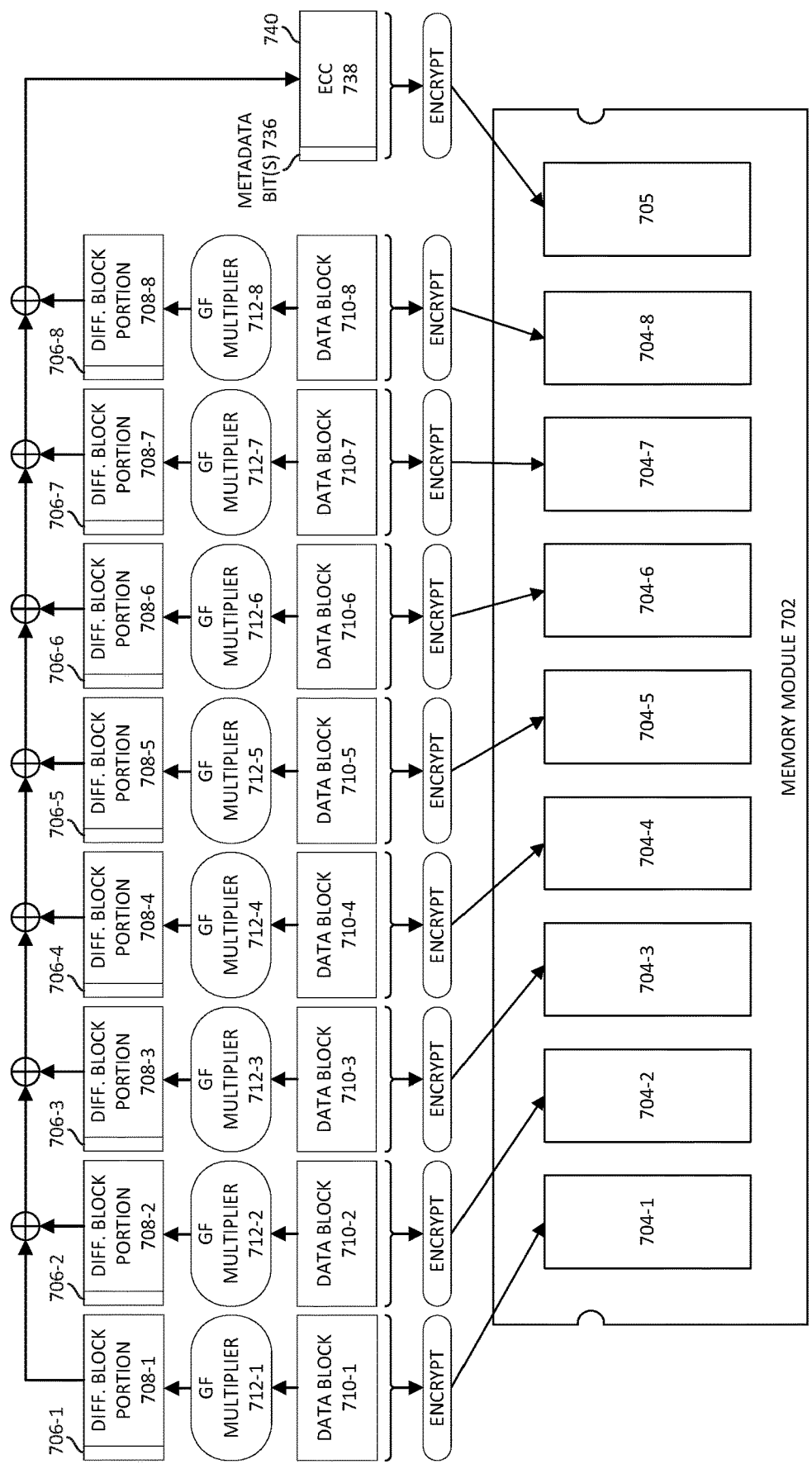
FIG. 7 illustrates a flow for generating a metadata block including an error correction code from a plurality of diffused blocks and storing an encrypted metadata block and encrypted data blocks in accordance with certain embodiments.

FIG. 7 illustrates a flow for generating a metadata block 740 including an error correction code 738 for a plurality of diffused blocks and storing an encrypted metadata block and encrypted data blocks in accordance with certain embodiments. In various embodiments, one or more components illustrated in FIG. 7 may be the same or similar to one or more components in FIG. 1 or FIG. 2. For instance, memory module 702 may have any one or more characteristics of memory module 102 or memory module 202, management memory device 705 may have any one or more characteristics of management memory device 105 or management memory device 205, the data blocks 710 (i.e., 710-1, 710-2, etc.) may have any one or more characteristics of data blocks 108 or data blocks 210, and the metadata block 740 may have any one or more characteristics of a metadata block described in connection with FIG. 1 or metadata block 240.

The flow of FIG. 7 may have any of the characteristics of the flow of FIG. 2, but the flow of FIG. 7 may provide additional security in some embodiments by performing a diffusion operation on each data block prior to calculating ECC 738. In the embodiment depicted, each data block 710 is diffused using a Galois Field (GF) multiplier 712. For example, block 710-1 is diffused using GF multiplier 712-1, block 710-2 is diffused using GF multiplier 712-2, and so on.

Although GF multipliers are depicted in FIG. 7, any suitable diffusion algorithm or other cryptographic algorithm may be used. For example, any suitable algorithm that diffuses bits across the entirety of the memory line comprised of data blocks 710 may be used. Diffusion may refer to redundancy in the statistics of the plaintext being dissipated in the statistics of the ciphertext. For example, a cipher having good diffusion properties may change each output bit with a probability of one half when an input bit is flipped.

The GF multiplications (or other diffusion operations) may result in generation of diffused blocks that include portions 706 that are not used to calculate the ECC 738 and portions 708 that are used to calculate the ECC 738 (e.g., in a manner similar to that discussed above with respect to ECC 238). In a particular embodiment, each GF multiplier 712 is distinct from each other GF multiplier 712. In some embodiments, the GF multipliers 712 (or properties of other diffusion algorithm) are kept secret (e.g., internal to the memory controller 110 or a host comprising the memory controller 110).

Such embodiments may prevent block replay attacks. For example, an adversary may know two plaintext memory lines and their corresponding encrypted text. Suppose two blocks i and j in one plaintext memory line produce the same XORed value as the blocks i and j in the second memory line. Blocks i and j in the encrypted first memory line may then be replaced with those from the second memory line. This new forged ciphertext will pass parity check after decryption due to linearity of parity. Such an attack is also possible with three or more blocks.

However, the flow of FIG. 7 may protect against such attacks. For example, the plaintext blocks may be multiplied with random secret values (e.g., 64b values using GF multiplication) prior to XORing portions of the blocks together to generate the ECC. This additional transformation may prevent a block replay attack, as an adversary does not know the secret values and cannot easily find two different blocks that would produce the same parity after transformation.

In various embodiments, the error identification and correction techniques described herein (e.g., in connection to FIGS. 3-5) may be adapted relatively easily to take the additional transformation into account. For example, a step to invert the diffusion operation (e.g., a step to invert the GF multiplication) may be added to reconstruct the actual data (e.g., data blocks 710).

Although the drawings depict particular computer systems, the concepts of various embodiments are applicable to any suitable integrated circuits and other logic devices. Examples of devices in which teachings of the present disclosure may be used include desktop computer systems, server computer systems, storage systems, handheld devices, tablets, other thin notebooks, systems on a chip (SOC) devices, and embedded applications. Some examples of handheld devices include cellular phones, digital cameras, media players, personal digital assistants (PDAs), and handheld PCs. Embedded applications may include a microcontroller, a digital signal processor (DSP), a system on a chip, network computers (NetPC), set-top boxes, network hubs, wide area network (WAN) switches, or any other system that can perform the functions and operations taught below. Various embodiments of the present disclosure may be used in any suitable computing environment, such as a personal computing device, a server, a mainframe, a cloud computing service provider infrastructure, a datacenter, a communications service provider infrastructure (e.g., one or more portions of an Evolved Packet Core), or other environment comprising a group of computing devices.

Figure 8:
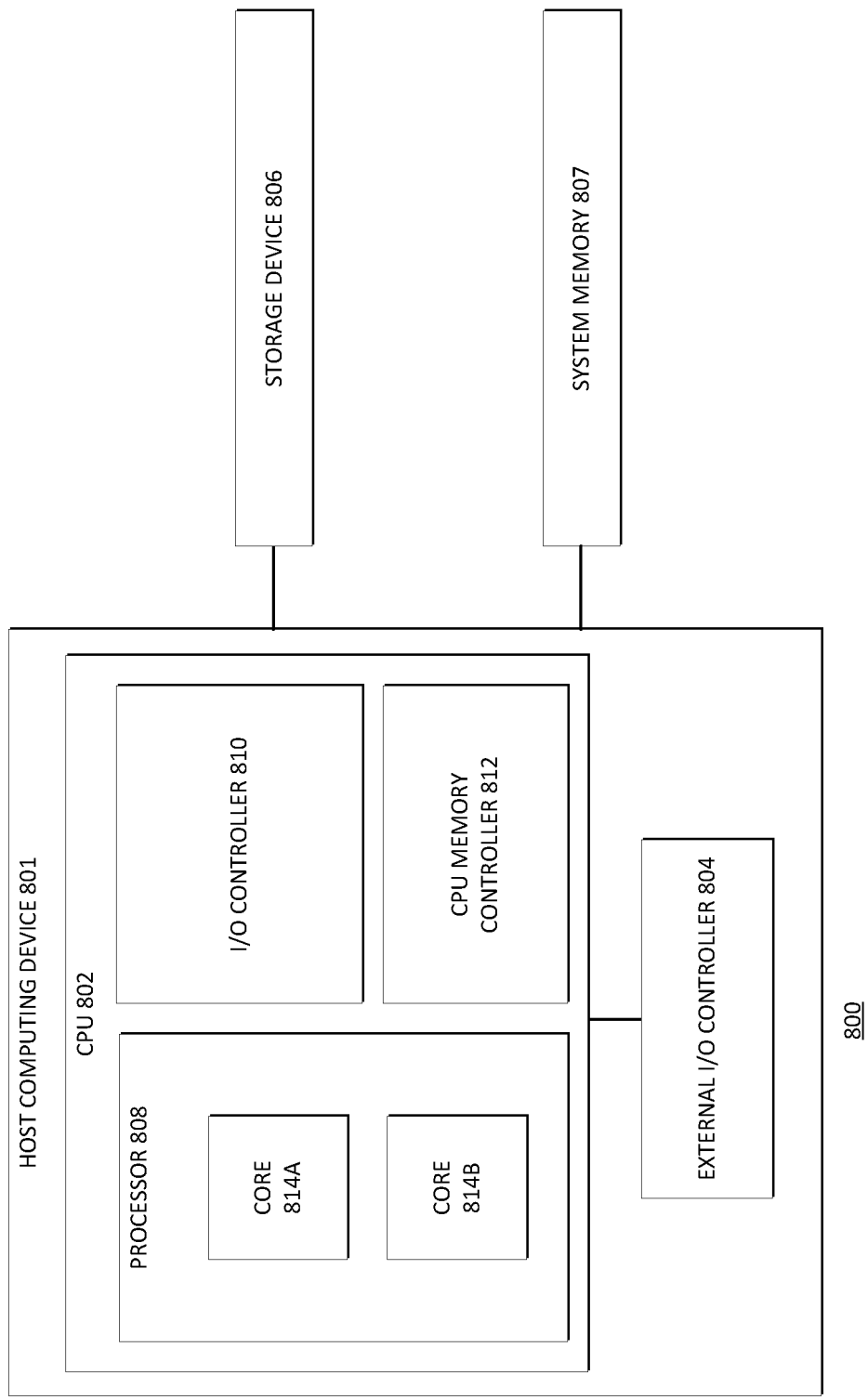
FIG. 8 illustrates a system for identifying and correcting data errors in accordance with certain embodiments.

FIG. 8 illustrates a system 800 for identifying and correcting data errors in accordance with certain embodiments. Any suitable components of system 800 may be used to perform any of the functions described above in connection with FIGS. 1-7. System 800 includes a host computing device 801 comprising a central processing unit (CPU) 802 coupled to an external input/output (I/O) controller 804, storage device 806, and system memory 807. In various embodiments, storage device 806 and/or system memory 807 may include or have any suitable characteristics of memory module 102 or memory module 202.

During operation, data may be transferred between storage device 806 or system memory 807 and the CPU 802. In various embodiments, particular data operations (e.g., erase, program, and read operations) involving a storage device 806 or system memory 807 may be managed by an operating system or other software application executed by processor 808.

CPU 802 comprises a processor 808, such as a microprocessor, an embedded processor, a digital signal processor (DSP), a network processor, a handheld processor, an application processor, a co-processor, a system on a chip (SOC), or other device to execute code (i.e., software instructions). Processor 808, in the depicted embodiment, includes two processing elements (cores 814A and 814B in the depicted embodiment), which may include asymmetric processing elements or symmetric processing elements. However, a processor may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 814 may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

I/O controller 810 is an integrated I/O controller. In various embodiments, I/O controller 810 may include any one or more characteristics of memory controller 110. I/O controller 810 may include logic for communicating data between CPU 802 and I/O devices, which may refer to any suitable devices capable of transferring data to and/or receiving data from an electronic system, such as CPU 802. For example, an I/O device may comprise an audio/video (A/V) device controller such as a graphics accelerator or audio controller; a data storage device controller, such as a flash memory device, magnetic storage disk, or optical storage disk controller; a wireless transceiver; a network processor; a network interface controller; or a controller for another input devices such as a monitor, printer, mouse, keyboard, or scanner; or other suitable device. In a particular embodiment, an I/O device may comprise a storage device 806 that may be coupled to the CPU 802 through I/O controller 810.

An I/O device may communicate with the I/O controller 810 of the CPU 802 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In particular embodiments, I/O controller 810 and the underlying I/O device may communicate data and commands in accordance with a logical device interface specification such as Non-Volatile Memory Express (NVMe) (e.g., as described by one or more of the specifications available at www.nvmexpress.org/specifications/) or Advanced Host Controller Interface (AHCI) (e.g., as described by one or more AHCI specifications such as Serial ATA AHCI: Specification, Rev. 1.3.1 available at http://www.intel.com/content/www/us/en/io/serial-ata/serial-ata-ahci-spec-rev1-3-1.html). In various embodiments, I/O devices coupled to the I/O controller may be located off-chip (i.e., not on the same chip as CPU 802) or may be integrated on the same chip as the CPU 802.

CPU memory controller 812 is an integrated memory controller. In various embodiments, CPU memory controller 812 may include any one or more characteristics of memory controller 110. CPU memory controller may include logic to control the flow of data going to and from one or more system memories 807. CPU memory controller 812 may include logic operable to read from a system memory 807, write to a system memory 807, or to request other operations from a system memory 807. In various embodiments, CPU memory controller 812 may receive write requests from cores 814 and/or I/O controller 810 and may provide data specified in these requests to a system memory 807 for storage therein. CPU memory controller 812 may also read data from a system memory 807 and provide the read data to I/O controller 810 or a core 814. During operation, CPU memory controller 812 may issue commands including one or more addresses of the system memory 807 in order to read data from or write data to memory (or to perform other operations). In some embodiments, CPU memory controller 812 may be implemented on the same chip as CPU 802, whereas in other embodiments, CPU memory controller 812 may be implemented on a different chip than that of CPU 802. I/O controller 810 may perform similar operations with respect to one or more storage devices 806.

The CPU 802 may also be coupled to one or more other I/O devices through external I/O controller 804. In a particular embodiment, external I/O controller 804 may couple a storage device 806 to the CPU 802. External I/O controller 804 may include logic to manage the flow of data between one or more CPUs 802 and I/O devices. In particular embodiments, external I/O controller 804 is located on a motherboard along with the CPU 802. The external I/O controller 804 may exchange information with components of CPU 802 using point-to-point or other interfaces. In various embodiments, external I/O controller 804 may include any one or more characteristics of memory controller 110.

A system memory 807 may store any suitable data, such as data used by processor 808 to provide the functionality of computer system 800. For example, data associated with programs that are executed or files accessed by cores 814 may be stored in system memory 807. Thus, a system memory 807 may include a system memory that stores data and/or sequences of instructions that are executed or otherwise used by the cores 814. In various embodiments, a system memory 807 may store persistent data (e.g., a user's files or instruction sequences) that remains stored even after power to the system memory 807 is removed. A system memory 807 may be dedicated to a particular CPU 802 or shared with other devices (e.g., one or more other processors or other devices) of computer system 800.

In various embodiments, a system memory 807 may include a memory comprising any number of memory arrays, a memory device controller (In various embodiments, the memory device controller may include any one or more characteristics of memory controller 110), and other supporting logic (not shown). A memory array may include non-volatile memory and/or volatile memory. Non-volatile memory is a storage medium that does not require power to maintain the state of data stored by the medium. Nonlimiting examples of nonvolatile memory may include any or a combination of: solid state memory (such as planar or 3D NAND flash memory or NOR flash memory), 3D crosspoint memory, memory devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMs), and magnetic storage memory. In some embodiments, 3D crosspoint memory may comprise a transistor-less stackable cross point architecture in which memory cells sit at the intersection of words lines and bit lines and are individually addressable and in which bit storage is based on a change in bulk resistance. Volatile memory is a storage medium that requires power to maintain the state of data stored by the medium. Examples of volatile memory may include various types of random access memory (RAM), such as dynamic random-access memory (DRAM) or static random-access memory (SRAM). One particular type of DRAM that may be used in a memory array is synchronous dynamic random-access memory (SDRAM). In some embodiments, any portion of memory 807 that is volatile memory can comply with JEDEC standards including but not limited to Double Data Rate (DDR) standards, e.g., DDR3, 4, and 5, or Low Power DDR4 (LPDDR4) as well as emerging standards.

A storage device 806 may store any suitable data, such as data used by processor 808 to provide functionality of computer system 800. For example, data associated with programs that are executed or files accessed by cores 814A and 814B may be stored in storage device 806. Thus, in some embodiments, a storage device 806 may store data and/or sequences of instructions that are executed or otherwise used by the cores 814A and 814B. In various embodiments, a storage device 806 may store persistent data (e.g., a user's files or software application code) that remains stored even after power to the storage device 806 is removed. A storage device 806 may be dedicated to CPU 802 or shared with other devices (e.g., another CPU or other device) of computer system 800.

In various embodiments, storage device 806 includes a storage device controller and one or more memory modules. In various embodiments, the storage device controller may include any one or more characteristics of memory controller 110. In various embodiments, a memory module of storage device 806 comprises one or more NAND flash memory arrays, one or more hard disk drives, or other suitable memory storage devices. Storage device 806 may comprise any suitable type of memory and is not limited to a particular speed, technology, or form factor of memory in various embodiments. For example, a storage device 806 may be a disk drive (such as a solid-state drive), a flash drive, memory integrated with a computing device (e.g., memory integrated on a circuit board of the computing device), a memory module (e.g., a dual in-line memory module) that may be inserted in a memory socket, or other type of storage device. Moreover, computer system 800 may include multiple different types of storage devices. Storage device 806 may include any suitable interface to communicate with CPU memory controller 812 or I/O controller 810 using any suitable communication protocol such as a DDR-based protocol, PCI, PCIe, USB, SAS, SATA, FC, System Management Bus (SMBus), or other suitable protocol. A storage device 806 may also include a communication interface to communicate with CPU memory controller 812 or I/O controller 810 in accordance with any suitable logical device interface specification such as NVMe, AHCI, or other suitable specification. In particular embodiments, storage device 806 may comprise multiple communication interfaces that each communicate using a separate protocol with CPU memory controller 812 and/or I/O controller 810.

In some embodiments, all, or some of the elements of system 800 are resident on (or coupled to) the same circuit board (e.g., a motherboard). In various embodiments, any suitable partitioning between the elements may exist. For example, the elements depicted in CPU 802 may be located on a single die (i.e., on-chip) or package or any of the elements of CPU 802 may be located off-chip or off-package. Similarly, the elements depicted in storage device 806 may be located on a single chip or on multiple chips. In various embodiments, a storage device 806 and a host computing device (e.g., CPU 802) may be located on the same circuit board or on the same device and in other embodiments the storage device 806 and the host computing device may be located on different circuit boards or devices.

The components of system 800 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, and a Gunning transceiver logic (GTL) bus. In various embodiments, an integrated I/O subsystem includes point-to-point multiplexing logic between various components of system 800, such as cores 814, one or more CPU memory controllers 812, I/O controller 810, integrated I/O devices, direct memory access (DMA) logic (not shown), etc. In various embodiments, components of computer system 800 may be coupled together through one or more networks comprising any number of intervening network nodes, such as routers, switches, or other computing devices. For example, a host computing device (e.g., CPU 802) and the storage device 806 may be communicably coupled through a network.

Although not depicted, system 800 may use a battery and/or power supply outlet connector and associated system to receive power, a display to output data provided by CPU 802, or a network interface allowing the CPU 802 to communicate over a network. In various embodiments, the battery, power supply outlet connector, display, and/or network interface may be communicatively coupled to CPU 802. Other sources of power can be used such as renewable energy (e.g., solar power or motion based power).

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

A module as used herein refers to circuitry and any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the flows described or functionality of the various components such as memory module 102, memory controller 110, memory module 202, CPU 802, external I/O controller 804, processor 808, cores 814A and 814B, I/O controller 810, CPU memory controller 812, storage device 806, system memory 807, subcomponents thereof, or other entity or component described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

In at least one embodiment, an apparatus comprises a controller comprising circuitry, the controller to generate an error correction code for a memory line, the memory line comprising a plurality of first data blocks, wherein the error correction code comprises parity bits generated based on first portions of a plurality of second data blocks, wherein the plurality of second data blocks are the first data blocks or diffused data blocks generated from the plurality of first data blocks; generate a metadata block corresponding to the memory line, wherein the metadata block comprises the error correction code for the memory line and at least one metadata bit; encode the first data blocks and the metadata block; and provide the encoded data blocks and the encoded metadata block for storage on a memory module.

In an embodiment, the plurality of second data blocks further comprise second portions that are not used to generate the error correction code. In an embodiment, the memory module comprises a plurality of memory devices and wherein the encoded metadata block and encoded data blocks are each stored on a separate memory device of the plurality of memory devices. In an embodiment, the controller is further to obtain a second plurality of encoded data blocks and a corresponding encoded metadata block from the memory module; decode the second plurality of encoded data blocks and the corresponding encoded metadata block; generate a validation block by combining a portion of each of the decoded data blocks via an exclusive or (XOR) operator; and determine whether at least one error is present in the second plurality of encoded data blocks or corresponding encoded metadata block based on a comparison between the validation block and an error correction code of the decoded metadata block. In an embodiment, the controller is further to obtain a second plurality of encoded data blocks and a corresponding encoded metadata block from the memory module; decode the second plurality of encoded data blocks and the corresponding encoded metadata block; select one of the decoded data blocks; generate a repair candidate comprising a speculative value of one or more bits and a combination via an XOR operator of an error correction code of the decoded metadata block and a portion of each decoded data block other than the selected decoded data block; and determine whether the selected decoded data block includes an error based at least in part on the repair candidate. In an embodiment, determining whether the selected data block includes an error based at least in part on the repair candidate comprises encoding the repair candidate and comparing the encoded repair candidate to an encoded data block corresponding to the selected decoded data block. In an embodiment, the controller is further to iterate through a plurality of speculative values of one or more bits to generate a plurality of repair candidates each including a respective one of the plurality of speculative values; and determine, for each of the repair candidates, whether the selected data block includes an error based at least in part on the repair candidate. In an embodiment, the determination of whether the selected data block includes an error is based at least in part on a score of at least one entropy test performed for the repair candidate relative to scores of entropy tests performed for other repair candidates generated for the other decoded data blocks. In an embodiment, the controller is further to determine that the selected decoded data block is more likely to include at least one error than the other decoded data blocks; and determine a confidence level associated with the determination that the selected decoded data block is more likely to include at least one error than the other decoded data blocks.

In an embodiment, the determination of whether the selected decoded data block includes an error based at least in part on the repair candidate comprises a determination of the number of bit values that differ between an encoding of the repair candidate and an encoded data block corresponding to the selected decoded data block. In an embodiment, the determination of whether the selected decoded data block includes an error based at least in part on the repair candidate comprises a determination of whether bit values that differ between an encoding of the repair candidate and an encoded data block corresponding to the selected decoded data block are indicative of a data pin failure of a memory device from which the encoded data block was read. In an embodiment, the at least one metadata bit includes an identifier of an encryption key.

In an embodiment, the number of bits of the at least one metadata bit plus the number of bits of the error correction code equals the number of bits of each first data block. In an embodiment, encoding the first data blocks and the metadata block comprises encrypting each first data block separately from each other and encrypting the metadata block separately from the first data blocks. In an embodiment, the apparatus further comprises a processor communicatively coupled to the controller and one or more of a battery communicatively coupled to the processor, a display communicatively coupled to the processor, or a network interface communicatively coupled to the processor. In an embodiment, the apparatus further comprises the memory module.

In at least one embodiment, a method comprises generating an error correction code for a memory line, the memory line comprising a plurality of first data blocks, wherein the error correction code comprises parity bits generated based on first portions of a plurality of second data blocks, wherein the plurality of second data blocks are the first data blocks or diffused data blocks generated from the plurality of first data blocks; generating a metadata block corresponding to the memory line, wherein the metadata block comprises the error correction code for the memory line and at least one metadata bit; encoding the first data blocks and the metadata block; and providing the encoded data blocks and the encoded metadata block for storage on a memory module.

In an embodiment the method further comprises obtaining a second plurality of encoded data blocks and a corresponding encoded metadata block from the memory module; decoding the second plurality of encoded data blocks and the corresponding encoded metadata block; generating a validation block by combining the same portion of each of the decoded data blocks via an exclusive or (XOR) operator; and determining whether an error exists in the encoded data blocks or encoded metadata block based on a comparison between the validation block and an error correction code of the decoded metadata block.

In at least one embodiment, at least one machine readable storage medium has instructions stored thereon, the instructions when executed by a machine to cause the machine to generate an error correction code for a memory line, the memory line comprising a plurality of first data blocks, wherein the error correction code comprises parity bits generated based on first portions of a plurality of second data blocks, wherein the plurality of second data blocks are the first data blocks or diffused data blocks generated from the plurality of first data blocks; generate a metadata block corresponding to the memory line, wherein the metadata block comprises the error correction code for the memory line and at least one metadata bit; encode the first data blocks and the metadata block; and provide the encoded data blocks and the encoded metadata block for storage on a memory module.

In an embodiment, the instructions when executed cause the machine to obtain a second plurality of encoded data blocks and a corresponding encoded metadata block from the memory module; decode the second plurality of encoded data blocks and the corresponding encoded metadata block; generate a validation block by combining the same portion of each of the decoded data blocks via an exclusive or (XOR) operator; and determine whether an error exists in the encoded data blocks or encoded metadata block based on a comparison between the validation block and an error correction code extracted from the decoded metadata block.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a controller comprising circuitry, the controller to:
generate an error correction code for a memory line, the memory line comprising a plurality of first data blocks, wherein the error correction code for the memory line is generated by performing one or more logical operations on first portions of each of a plurality of second data blocks, wherein the error correction code enables reconstruction of the first portion of a particular second data block based on the first portions of the other second data blocks, wherein the plurality of second data blocks are the first data blocks or diffused data blocks generated from the plurality of first data blocks;
generate a metadata block corresponding to the memory line, wherein the metadata block comprises the error correction code for the memory line and at least one metadata bit;
encode the first data blocks and the metadata block; and
provide the encoded data blocks and the encoded metadata block for storage on a memory module.

2. The apparatus of claim 1, wherein the plurality of second data blocks each further comprise second portions, wherein the second portions of the second data blocks are not used to generate the error correction code for the memory line.

3. The apparatus of claim 1, wherein the memory module comprises a plurality of memory devices and wherein the encoded metadata block and encoded data blocks are each stored on a separate memory device of the plurality of memory devices.

4. The apparatus of claim 1, the controller further to:
obtain a second plurality of encoded data blocks and a corresponding encoded metadata block from the memory module;
decode the second plurality of encoded data blocks and the corresponding encoded metadata block;
generate a validation block by combining a portion of each of the decoded data blocks via an exclusive or (XOR) operator; and
determine whether at least one error is present in the second plurality of encoded data blocks or corresponding encoded metadata block based on a comparison between the validation block and an error correction code of the decoded metadata block.

5. The apparatus of claim 1, the controller further to:
obtain a second plurality of encoded data blocks and a corresponding encoded metadata block from the memory module;
decode the second plurality of encoded data blocks and the corresponding encoded metadata block;

select one of the decoded data blocks;
generate a repair candidate comprising a speculative value of one or more bits and a combination via an XOR operator of an error correction code of the decoded metadata block and a portion of each decoded data block other than the selected decoded data block; and
determine whether the selected decoded data block includes an error based at least in part on the repair candidate.

6. The apparatus of claim 5, wherein determining whether the selected data block includes an error based at least in part on the repair candidate comprises encoding the repair candidate and comparing the encoded repair candidate to an encoded data block corresponding to the selected decoded data block.

7. The apparatus of claim 5, the controller further to:
iterate through a plurality of speculative values of one or more bits to generate a plurality of repair candidates each including a respective one of the plurality of speculative values; and
determine, for each of the repair candidates, whether the selected data block includes an error based at least in part on the repair candidate.

8. The apparatus of claim 5, wherein the determination of whether the selected data block includes an error is based at least in part on a score of at least one entropy test performed for the repair candidate relative to scores of entropy tests performed for other repair candidates generated for the other decoded data blocks.

9. The apparatus of claim 5, the controller further to:
determine that the selected decoded data block is more likely to include at least one error than the other decoded data blocks; and
determine a confidence level associated with the determination that the selected decoded data block is more likely to include at least one error than the other decoded data blocks.

10. The apparatus of claim 5, wherein the determination of whether the selected decoded data block includes an error based at least in part on the repair candidate comprises a determination of the number of bit values that differ between an encoding of the repair candidate and an encoded data block corresponding to the selected decoded data block.

11. The apparatus of claim 5, wherein the determination of whether the selected decoded data block includes an error based at least in part on the repair candidate comprises a determination of whether bit values that differ between an encoding of the repair candidate and an encoded data block corresponding to the selected decoded data block are indicative of a data pin failure of a memory device from which the encoded data block was read.

12. The apparatus of claim 1, wherein the at least one metadata bit includes an identifier of an encryption key.

13. The apparatus of claim 1, wherein the number of bits of the at least one metadata bit plus the number of bits of the error correction code equals the number of bits of each first data block.

14. The apparatus of claim 1, wherein encoding the first data blocks and the metadata block comprises encrypting each first data block separately from each other and encrypting the metadata block separately from the first data blocks.

15. The apparatus of claim 1, further comprising a processor communicatively coupled to the controller and one or more of a battery communicatively coupled to the processor, a display communicatively coupled to the processor, or a network interface communicatively coupled to the processor.

16. The apparatus of claim 1, further comprising the memory module.

17. The apparatus of claim 1, wherein the error correction code is generated by combining the first portions of each of the plurality of second data blocks via an exclusive or (XOR) operator.

18. A method comprising:
generating an error correction code for a memory line, the memory line comprising a plurality of first data blocks, wherein the error correction code for the memory line is generated by performing one or more logical operations on first portions of each of a plurality of second data blocks, wherein the error correction code enables reconstruction of the first portion of a particular second data block based on the first portions of the other second data blocks, wherein the plurality of second data blocks are the first data blocks or diffused data blocks generated from the plurality of first data blocks;
generating a metadata block corresponding to the memory line, wherein the metadata block comprises the error correction code for the memory line and at least one metadata bit;
encoding the first data blocks and the metadata block; and
providing the encoded data blocks and the encoded metadata block for storage on a memory module.

19. The method of claim 18, further comprising:
obtaining a second plurality of encoded data blocks and a corresponding encoded metadata block from the memory module;
decoding the second plurality of encoded data blocks and the corresponding encoded metadata block;
generating a validation block by combining the same portion of each of the decoded data blocks via an exclusive or (XOR) operator; and
determining whether an error exists in the encoded data blocks or encoded metadata block based on a comparison between the validation block and an error correction code of the decoded metadata block.

20. At least one machine readable storage medium having instructions stored thereon, the instructions when executed by a machine to cause the machine to:
generate an error correction code for a memory line, the memory line comprising a plurality of first data blocks, wherein the error correction code for the memory line is generated by performing one or more logical operations on first portions of each of a plurality of second data blocks, wherein the error correction code enables reconstruction of the first portion of a particular second data block based on the first portions of the other second data blocks, wherein the plurality of second data blocks are the first data blocks or diffused data blocks generated from the plurality of first data blocks;
generate a metadata block corresponding to the memory line, wherein the metadata block comprises the error correction code for the memory line and at least one metadata bit;
encode the first data blocks and the metadata block; and
provide the encoded data blocks and the encoded metadata block for storage on a memory module.

21. The at least one medium of claim 20, the instructions when executed to cause the machine to:
obtain a second plurality of encoded data blocks and a corresponding encoded metadata block from the memory module;
decode the second plurality of encoded data blocks and the corresponding encoded metadata block;

generate a validation block by combining the same portion of each of the decoded data blocks via an exclusive or (XOR) operator; and determine whether an error exists in the encoded data blocks or encoded metadata block based on a comparison between the validation block and an error correction code extracted from the decoded metadata block.

* * * * *